US011611888B2

(12) United States Patent
Sevindik et al.

(10) Patent No.: US 11,611,888 B2
(45) Date of Patent: *Mar. 21, 2023

(54) METHODS AND APPARATUS FOR USING WIRELESS BASE STATION ANTENNAS TO SUPPORT MACRO BASE STATION MIMO COMMUNICATIONS WITH USER EQUIPMENT DEVICES

(71) Applicant: Charter Communications Operating, LLC, St. Louis, MO (US)

(72) Inventors: Volkan Sevindik, Parker, CO (US); Haider Syed, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 252 days.

This patent is subject to a terminal disclaimer.

(21) Appl. No.: 17/027,878

(22) Filed: Sep. 22, 2020

(65) Prior Publication Data
US 2021/0006988 A1 Jan. 7, 2021

Related U.S. Application Data

(63) Continuation of application No. 16/207,162, filed on Dec. 2, 2018, now Pat. No. 10,820,214.

(51) Int. Cl.
H04W 16/32 (2009.01)
H04W 76/15 (2018.01)
H04W 84/04 (2009.01)

(52) U.S. Cl.
CPC .......... *H04W 16/32* (2013.01); *H04W 84/045* (2013.01)

(58) Field of Classification Search
None
See application file for complete search history.

(56) References Cited

U.S. PATENT DOCUMENTS

| 2013/0281097 | A1* | 10/2013 | Jung | H04W 36/0066 455/444 |
| 2014/0003275 | A1* | 1/2014 | Morimoto | H04B 7/024 370/252 |
| 2014/0269632 | A1* | 9/2014 | Blankenship | H04W 76/15 370/336 |
| 2015/0045038 | A1* | 2/2015 | Gao | H04W 36/0027 455/438 |
| 2015/0133130 | A1* | 5/2015 | Gupta | H04W 36/00837 455/450 |

(Continued)

*Primary Examiner* — Duc T Duong
(74) *Attorney, Agent, or Firm* — Straub & Straub; Stephen T. Straub; Michael P. Straub

(57) ABSTRACT

Methods, apparatus, and systems for using multiple antennas located in Citizens Broadcast Radio Service Devices (CBSDs) to communicate with a user equipment device. An exemplary method embodiment includes the steps of: (i) receiving by a macro base station a first set of data to be transmitted to a user equipment device (UE), (iii) dividing by the macro base station said first set of data into a plurality of N data blocks, and (iv) communicating by the macro base station to each of a plurality of different Citizens Broadband Radio Service Devices (CBSDs) one or more different ones of said plurality of N data blocks; and (v) operating the plurality of CBSDs to transmit the one or more data blocks which they receive from the macro base station to the UE. In various embodiments, the macro base station also transmits one or more of the N data blocks to the UE.

20 Claims, 18 Drawing Sheets

(56) References Cited

U.S. PATENT DOCUMENTS

| | | | |
|---|---|---|---|
| 2015/0223185 A1* | 8/2015 | Harris | H04W 52/0206 |
| | | | 455/456.5 |
| 2017/0238136 A1* | 8/2017 | Smith | H04M 1/72457 |
| | | | 455/456.3 |
| 2017/0374579 A1* | 12/2017 | Wang | H04L 47/30 |
| 2018/0132111 A1* | 5/2018 | Mueck | H04B 1/715 |
| 2018/0206282 A1* | 7/2018 | Singh | H04W 76/15 |
| 2019/0037443 A1* | 1/2019 | Lee | H04L 47/34 |
| 2019/0223037 A1* | 7/2019 | Raghothaman | H04W 72/085 |
| 2019/0373615 A1* | 12/2019 | Cimpu | H04W 72/14 |
| 2020/0008007 A1* | 1/2020 | Belghoul | H04W 4/50 |
| 2020/0037211 A1* | 1/2020 | Hine | H04W 36/0058 |
| 2020/0059849 A1* | 2/2020 | Bencheikh | H04W 40/22 |

\* cited by examiner

METHODS AND APPARATUS FOR USING WIRELESS BASE STATION ANTENNAS TO SUPPORT MACRO BASE STATION MIMO COMMUNICATIONS WITH USER EQUIPMENT DEVICES

RELATED APPLICATIONS

The present application is a continuation of U.S. patent application Ser. No. 16/207,162 filed on Dec. 2, 2018 which published as U.S. Patent Application Publication Number: US 2020-0178089 Al on Jun. 4, 2020 which is hereby expressly incorporated by reference in its entirety.

FIELD OF INVENTION

The present invention relates to methods and apparatus for using antennas at both Citizens Broadband Radio Service Devices (CBSDs) in Citizen Broadband Radio Service (CBRS) network and macro base stations to transfer data to user devices. The present invention further relates to methods and apparatus for utilizing multiple antennas of CBSD devices and macro base stations to perform Multiple-Input and Multiple-Output (MIMO) data transmissions to wireless user devices.

BACKGROUND OF THE INVENTION

In a Citizens Broadband Radio Service (CBRS) network, Citizens Broadband Radio Service Devices (CBSDs) serve as access points which can support communications between a user equipment device (UE) and a service provider network. Multiple-Input and Multiple-Output (MIMO) transmission takes advantage of multiple antennas and spatial diversity of the antennas to support communication to/from a device.

Macro base stations often include several antennas and can in many cases support limited MIMO operation. However, to support communication of relatively large amounts of data to/from a user equipment device (UE) it would be highly desirable if greater spatial diversity could be achieved than is possible from simply using an antenna array directly coupled to a macro base station.

In many areas CBRS communication is expected to be supported in communications areas which are within a coverage area of a macro base station. In such system CBSDs may use the same frequency spectrum as the macro base station but are expected in many cases to communicate using a different communications protocol than is used by the macro base station. CBSDs are likely to be distributed, e.g., positioned at various different locations in the macro base station coverage area with CBSD operation being controlled, at least partially under direction of a Spectrum Access System (SAS).

It would be desirable if methods and/or apparatus could be developed which would allow the infrastructure being deployed to support CBRS communication to also be used to facilitate macro network communication of data to and/or from UEs. In this way antennas and/or other equipment which might not be fully utilized if used simply for CBRS communication could be used to enhance and/or otherwise facilitate macro network communication.

SUMMARY OF THE INVENTION

The present invention relates to methods, systems and apparatus for a macro base station to use multiple antennas to communicate with a user equipment device, e.g., a mobile device. More particular the present invention relates to methods, systems and apparatus for a macro base station to utilize antennas of Citizens Broadband Radio Services Devices (CBSDs) in a Citizens Broadband Radio Service (CBRS) network to wireless communicate with a user equipment device, e.g., a mobile communications device. The user device being a dual Subscriber Identity Module device that allows it to communicate with both the macro base station which is part of a first network, e.g., a MVNO network, and CBSDs in a second network, i.e., a CBRS network. One or more embodiments of the present invention are directed to solving the aforementioned problems.

An exemplary method embodiment of present invention includes the steps of: (i) operating a first macro base station to receive a first set of data to be transmitted to a first user equipment device (UE); (ii) operating the first macro base station to divide said first set of data into a plurality of N data blocks; (iii) operating the first macro base station to communicate to each of a plurality of different Citizens Broadband Radio Service Devices (CBSDs) one or more different ones of said plurality of N data blocks; and (iv) operating the plurality of CBSDs to transmit the one or more data blocks which they receive from the first macro base station to the first UE. The first macro base station may, and typically does, communicate one or more of the N data blocks to the first UE device.

An exemplary method embodiment of present invention includes the steps of: (i) operating a first macro base station to receive a first set of data to be transmitted to a first user equipment device (UE) (ii) operating the first macro base station to divide said first set of data into a plurality of N data blocks; (iii) operating the first macro base station to communicate to each of a plurality of different Citizens Broadband Radio Service Devices (CBSDs) one or more different ones of said plurality of N data blocks; and (iv) operating the plurality of CBSDs to transmit the one or more data blocks which they receive from the first macro base station to the first UE. The first macro base station may, and typically does, communicate one or more of the N data blocks to the first UE device.

The CBSDs and the first macro base station may and typically do use the same frequency spectrum. In some embodiments, the first macro base station is part of a macro network, e.g., (LTE network) and the CBSDs are part of a Citizens Broadcast Radio Service (CBRS) network. In the exemplary embodiment, the first UE is a dual Subscriber Identity Module (SIM) card UE capable of communicating with the first macro network using a mobile identity corresponding to a first Subscriber Identity Module (SIM) card and communicating with a CBRS network including the CBSD using a mobile identity corresponding to the second Subscriber Identity Module (SIM) card.

The exemplary method may, and typically does, include the additional step of operating the first macro base station to encode each of the N data blocks using an orthogonal code prior to performing said step of communicating to each of a plurality of different CBSDs one or more different ones of said plurality of N data blocks. That is each block is coded so that it is independent of the other blocks for purposes of transmission from different CBSDs before it is communicated over the X2 connection to the CBSDs.

In some embodiments of the method, the method includes operating the first UE to report Physical Cell Identities (PCIs) of macro base stations from which first UE receive signals, said PCI of macro base stations including the PCI of the first macro base station and operating a Spectrum Access System (SAS) to determine from PCI information reported by said first UE, CBSDs in the coverage area of said first macro base station. The SAS may, and sometimes does, instruct the CBSDs in the coverage area of the first macro base station to establish X2 connections with the first macro base station.

In some embodiments the CBSDs in the coverage area of said first macro base station is operated to establish X2 connections with said first macro base station. Typically, the first macro base station measures the latency of X2 connections to the CBSDs with which X2 connections are established and communicates one or more data blocks to individual CBSDs in the plurality of different CBSDs in an order based on the latency of an individual X2 connection between the first macro base station and the individual CBSD to which the individual X2 communication corresponds. The order of the data block transmission over the X2 connections being from highest X2 connection latency to lowest X2 connection latency. In many embodiments, ping operations are used to measure the X2 connection link latency which may be and typically is an average link latency.

In most, but not all embodiments, the first macro base station determines the total number of antennas to be used to communicate data to said first UE. The total number of antennas is then used by the macro base station to determine a size of a set of data, to be requested from a macro network core, for transmission to the first UE based on the number of antennas available for use in transmitting to the first UE. The number of antennas available for use in transmitting including at least some CBSD antennas at CBSDs having X2 connections with the first macro base station and in typically the number of antennas the macro base station has available for communicating with the first UE.

The present invention is applicable to apparatus and system embodiments wherein one or more devices implement the steps of the method embodiments. In some apparatus embodiments each of CBDS, user equipment devices, SAS devices, registrars, macro base stations and each of the other apparatus/devices of the system include one or more processors and/or hardware circuitry, input/output interfaces including receivers and transmitters, antennas and a memory. The memory including instructions when executed by the processor control the apparatus/device of the system to operate to perform the steps of various method embodiments of the invention.

The present invention is also applicable to and includes apparatus and systems such as for example, apparatus and systems that implement the steps of the method embodiments. An exemplary communications system includes: a first macro base station; and a plurality of different Citizens Broadband Radio Service Devices (CBSDs); the first macro base station including one or more processors that control the first macro base station to: (i) receive a first set of data to be transmitted to a first user equipment device (UE), (ii) divide said first set of data into a plurality of N data blocks, and (iii) communicate to each of a plurality of different Citizens Broadband Radio Service Devices (CBSDs) one or more different ones of said plurality of N data blocks; and (iv) each of said plurality of CBSDs including one or more processors that control the CBSD to transmit the one or more data blocks which the CBSD receives from the first macro base station to the first UE. In some embodiments, the first macro base station keeps and sends one or more of the N data blocks so the number of blocks communicated to CBSDs can be less than N with the first macro base station transmitting at least one block, each CBSD can receive more than one data block with N corresponding to the N number of antennas which will be used to separately transmit data including the antennas of the first macro base station and the CBSDs.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 10 illustrates the combination of FIGS. 10A, 10B and 10C.

DETAILED DESCRIPTION

Figure 1:
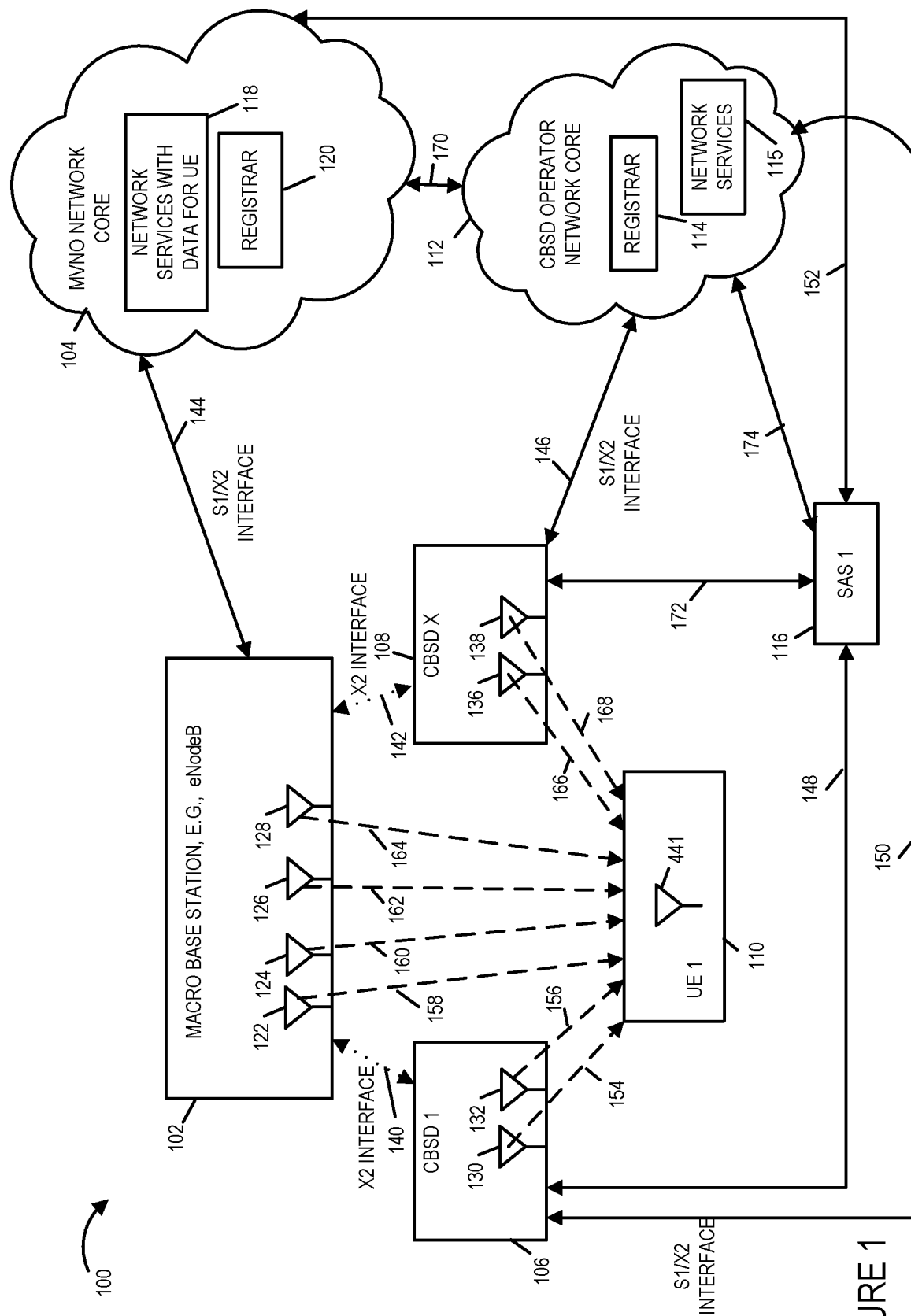
FIG. 1 illustrates an exemplary communications system in accordance with one embodiment of the present invention.

The current invention is applicable to communications methods and systems implemented in wireless networks and in particular to Citizens Broadband Radio Service networks. More particularly the invention is applicable to systems which use multiple antennas both at Citizens Broadband Radio Service Devices (CBSDs) and macro base station (e.g., eNodeB) of a first wireless network provider, e.g., macro Mobile Virtual Network Operator (MVNO) of a Long Term Evolution (LTE) network, to provide wireless communications services to user devices, e.g., mobile devices, mobile phones, laptops, tablets, computers, vehicles, drones, etc. that support wireless communications with the CBSDs of the CBRS network as well as communications with the macro base station of the first wireless network (e.g., MVNO LTE network). The invention further relates to methods and apparatus for using CBSD antennas to support macro base station Massive In Massive Out (MIMO) communication with user equipment devices. As discussed above, MIMO transmissions take advantage of multiple antennas and spatial diversity of the antennas to support communications to/from a device, e.g., user device.

Citizens Broadband Radio Service networks are networks that include Citizens Broadband Radio Service Devices (CBSDs) which serve as access points/base stations, Spectrum Access Systems which provides spectrum assignments and manages frequency interference through power management of the CBSDs transmission power, and user equipment. User equipment devices being user devices used for communications over the CBRS network and include for example computers, mobile or wireless devices such as for example cell phones, smart phones, laptops, tablets, vehicles (e.g., cars, trucks, airplanes, trains, drone, airplanes, etc.) with wireless communications equipment (e.g., antennas, receivers, transmitters, sensors, processors, memory for wireless communications), etc. The size of a user device determining the number of antennas and the spatial and directional diversity of antennas arrangement that can be utilized with larger devices able to include more antennas with more spatial and directional diversity than smaller devices. For example, a greater number of antennas can be arranged so that the antennas have a greater spatial (different spacings) and directional diversity (e.g., pointing in different directions) on a truck than a mobile phone due to the truck's larger size. This results in the user device of the truck having a larger number of antennas and greater spatial and directional diversity than the smaller mobile phone whose number of antennas and their direction and spacing is limited by its smaller size.

The Citizens Broadband Radio Service network utilizes the 150 megahetz in the 3550-3700 MHz band referred to as the 3.5 GHz Band. The CBRS network includes Spectrum Access Systems that obtain information about registered or licensed commercial users in the 3.5 GHz band from FCC databases and information about federal incumbent users of the band from ESC (Environmental Sensing Capability) system and interact directly or indirectly with CBSDs operating in the band to ensure that Citizens Broadband Radio Service users operate in a manner consistent with their authorizations and promote efficient use of the spectrum resource. Among the Spectrum Access System functions as defined in the Amendment of the Commission's Rules with Regard to Commercial Operations in the 3550-3650 MHz Band released Apr. 21, 2015 are that: it determines the available frequencies at a given geographic location and assign them to CBSDs; it determines the maximum permissible transmission power level for CBSDs at a given location and communicates that information to the CBSDs; it registers and authenticates the identification information and location of CBSDs; it enforces exclusion and protection zones, including any future changes to such Zones, to ensure compatibility between Citizens Broadband Radio Service users and incumbent federal operations; it protects Priority Access Licensees (PAL) from impermissible interference from other Citizens Broadband Radio Service users; ensures secure and reliable transmission of information between the SAS, ESC, and CBSDs; and it facilitates coordination and information exchange between SASs. Through the management of the CBSDs power transmission levels in a geographical area the SAS manages the radio interference in the geographical area.

The Citizens Broadband Radio Service network utilizes the 150 megahetz in the 3550-3700 MHz band referred to as the 3.5 GHz Band. Macro base stations, e.g., LTE eNodeB base stations, of wireless networks also operate in the 3.5 GHz band.

One exemplary communications system used to implement an exemplary embodiment in accordance with the present invention is shown in FIG. 1.

FIG. 1 illustrates an exemplary communications system 100 having an architecture implemented in accordance with the present invention. The communications system 100 includes a Mobile Virtual Network Operator (MVNO) Network including a macro base station 102, e.g., eNodeB, and a MVNO core network 104 and a CBRS network including SAS 1 116, CBSD device 1 106 . . . . CBSD device X 108 (where X is a positive integer number), CBSD operator network core 112 and a user equipment device (UE 1) 110.

The UE 1 110 is a dual SIM (subscriber identity module) user equipment device that communicates with both the macro base station 102 of the MVNO network and CBSD 1 106 CSBD X devices of the in the CBRS network. While only one user equipment device is shown for simplicity it is to be understood that he CBRS network has one or more user equipment devices. Similarly while only one macro base station is shown in the system 100 it is to be understood that the MVNO network may and typically does include a plurality of macro base stations.

The macro base station 102 may be for example, an LTE eNodeB base station of a Mobile Virtual Network Operator (MVNO) Network, e.g., a eNodeB owned by a service operator such as Verizon or TMobile. In some situations, the CBRS network operator may have entered into an agreement for use of the MVNO network by the CBRS network operator to provide voice and data services in exchange for payment. In such cases the CBRS network operator will desire to use the MVNO network over the air resources as little as possible and to use the CBRS over the air resources whenever possible to avoid having to incur costs and/or expenses with the usage of the MVNO network. This is particularly the case when the CBRS network operator is performing data transfer to user equipment devices. To increase the usage of the CBRS network while minimizing the usage of the MVNO network the CBRS network operator may utilize massive or advanced multiple input multiple output (MIMO) features which utilizes multiple antennas to transmit data to multiple users at the same time. The massive MIMO or advanced MIMO features uses large numbers of antennas to transmit data to users. This allows for an increased quality of experience by increasing the data speed in the downlink. One of the main problems is that because of the power and space limitations a single MVNO macro base station, e.g., eNodeB, does not hold a large number of antennas, e.g., hundreds of antennas. A solution to this problem is to use CBSD antennas together with the MVNO macro base station antennas to create a massive MIMO or advance MIMO scenario. In such cases, the user devices, e.g., mobile devices, need to have dual-sim cards enabling the user devices to communicate with both the macro base station of the MVNO network and the CBSDs of the CBRS network. The subscribers of the user devices register in both the CBRS network and the service operator network (MVNO) network so that they can receive service from either network during the same time period. The massive MIMO or advanced MIMO operation is then triggered by the SAS service depending on the location of the user device, the amount of data that needs to be transmitted to the user device and the number of antennas reported by the CBSDs in communication with the user device to which service is being provided.

The MVNO network core 104 includes a registrar 120 and network services with data 118 for UE 1 110. The MVNO network coupled is coupled to the CBSD operator network core 112 with a communication link 170. The CSBD operator network core includes registrar 114 and network services 115. CBSD 1 is coupled to the SAS 1

The MVNO network includes a MVNO network core 104 including a registrar 120, e.g., Home Subscriber Server (HSS), and a macro base station 102, e.g., eNodeB 102, which is connected to the MVNO network core 104 via S1/X2 interface connection 144 and a communication link. The communications link may be wired and/or wireless. When a wired communications link is utilized it is typically a high capacity wired cable or fiber optical cable. While only one macro base station 102 is illustrated, it is to be understood that the MVNO network typically has numerous macro base stations. The UE 1 110 is a dual subscriber identity card device with a subscriber identity module (SIM) card for wireless communication with the macro base station, eNodeB 102 as well as with CBSDs CBSD 1 106 and CBSD X 10, i.e., UE 1 110 is a dual SIM card device that can communicate with both the CBSD(s) of the CBRS network and macro base station(s) of the MVNO network. The UE 1 110 is within the coverage area of CBSD 1 106, CBSD X 108 and the macro base station 102 of the MVNO network. The MVNO network in this example is a Long Term Evolution (LTE) Evolved Packet Core Network which operates in the same frequency spectrum as the CBRS network frequency spectrum.

The exemplary CBRS network of system 100 includes Citizens Broadcast Radio Service Device (CBSD) 1 106, CBSD X 108, Spectrum Access System device 116, and a user equipment (UE) device UE 1 110 as well as CBSD operator network core sometimes referred to as the CBSD or CBRS core network. The CBSD 1 106 is connected or coupled to SAS 1 116 via communications link 148 and to the second operator network core 112 which is the CBSD operator network core via via an S1/X2 interface/connection 150 and a communications link. The CBSD X 108 is coupled or connected to the SAS 1 116 via communication link 172 and to the second operator network 112 which is the CBSD operator network core via S1/X2 interface/connection 146 and a communications link. The SAS 1 is coupled to the second operator network 112 via communications link 174. The SAS 1 is coupled to the first operator network 104 via communications link 152.

The first operator, e.g., MVNO, network core 104 is coupled or connected to the second operator, CBSD operator, core network 112 via communications link 170.

Communications links 148, 150, 152 and 174 are typically wired or fiber optic communications links. The second operator is the same operator that operates CBSD 1 and CBSD X and is sometimes referred to as the CBSD operator with the second operator network core 112 sometimes being referred to as the CBSD operator network core.

The MVNO network core 104 includes a registrar 120 and network services with data for UE 118. The CBSD operator network core 112 includes a registrar 114, e.g., Home Subscriber Server (HSS), and network services equipment 115.

The macro base station 102 in some embodiments is an LTE macro base station, e.g., eNodeB base station. The macro base station typically includes one or more receivers, transmitters, antennas and processors with the one or more processors controlling the operation of the macro base station. The macro base station 102 includes a plurality of antennas 122, 124, 126 and 128.

CBSD 1 106 includes antennas 130 and 132. CBSD 1 106 is connected or coupled to the macro base station 102 via X2 interface/connection 140. CBSD X 108 includes antennas 136 and 138. CBSD X 108 is connected or coupled to the macro base station 102 via X2 interface/connection 142. Dashed line 154 shows the transmission and wireless communication of data from CBSD 1 106 antenna 130 to UE 110. Dashed line 156 shows the transmission and wireless communication of data from CBSD 1 106 antenna 132 to UE 110. Dashed line 158 shows the transmission and wireless communication of data from the macro base station 102 antenna 122 to UE 110. Dashed line 160 shows the transmission and wireless communication of data from macro base station 102 antenna 124 to UE 110. Dashed line 162 shows the transmission and wireless communication of data from macro base station 102 antenna 126 to UE 110. Dashed line 164 shows the transmission and wireless communication of data from macro base station 102 antenna 128 to UE 110. Dashed line 166 shows the transmission and wireless communication of data from CBSD X 108 antenna 136 to UE 110. Dashed line 168 shows the transmission and wireless communication of data from CBSD X 108 antenna 138 to UE 110. The dashed lines 154, 156, 158, 160, 162, 164, 166 and 168 also represent the communications links and/or communications channels, e.g., radio channels, over which the macro base station 102, CBSD 1 106 and CBSD X 108 communicate with UE 1 110.

UE 1 110 includes antenna 134 for wireless communications with CBSD 1 106, CBSD X 108 and macro base station 102. The antenna 134 can be an assembly of antennas that include multiple antennas such as for example 8 antennas or can be an antenna array with multiple elements.

While for the sake of simplicity in explaining the invention system 100 only illustrates two CBSDs, a single macro base station and a single UE device, it will be appreciated that system 100 typically includes numerous active CBSDs in the CBRS network supporting a plurality of UE devices and the MVNO network typically includes numerous active macro base stations. The UE devices in the present invention are dual SIM devices that can communicate with both the macro base station and the CBSDs.

The devices' X2 interfaces/connections and S1/X2 interfaces/connections provide communications interfaces/connections for the various devices to communicate with one another over communications links which may be wired and/or wireless links. Wired links may be, and in some embodiments are, high capacity fiber optic or cable links.

Elements or steps with the same reference numbers used in different figures are the same or similar and those elements or steps will not be described in detail again.

Figure 3:
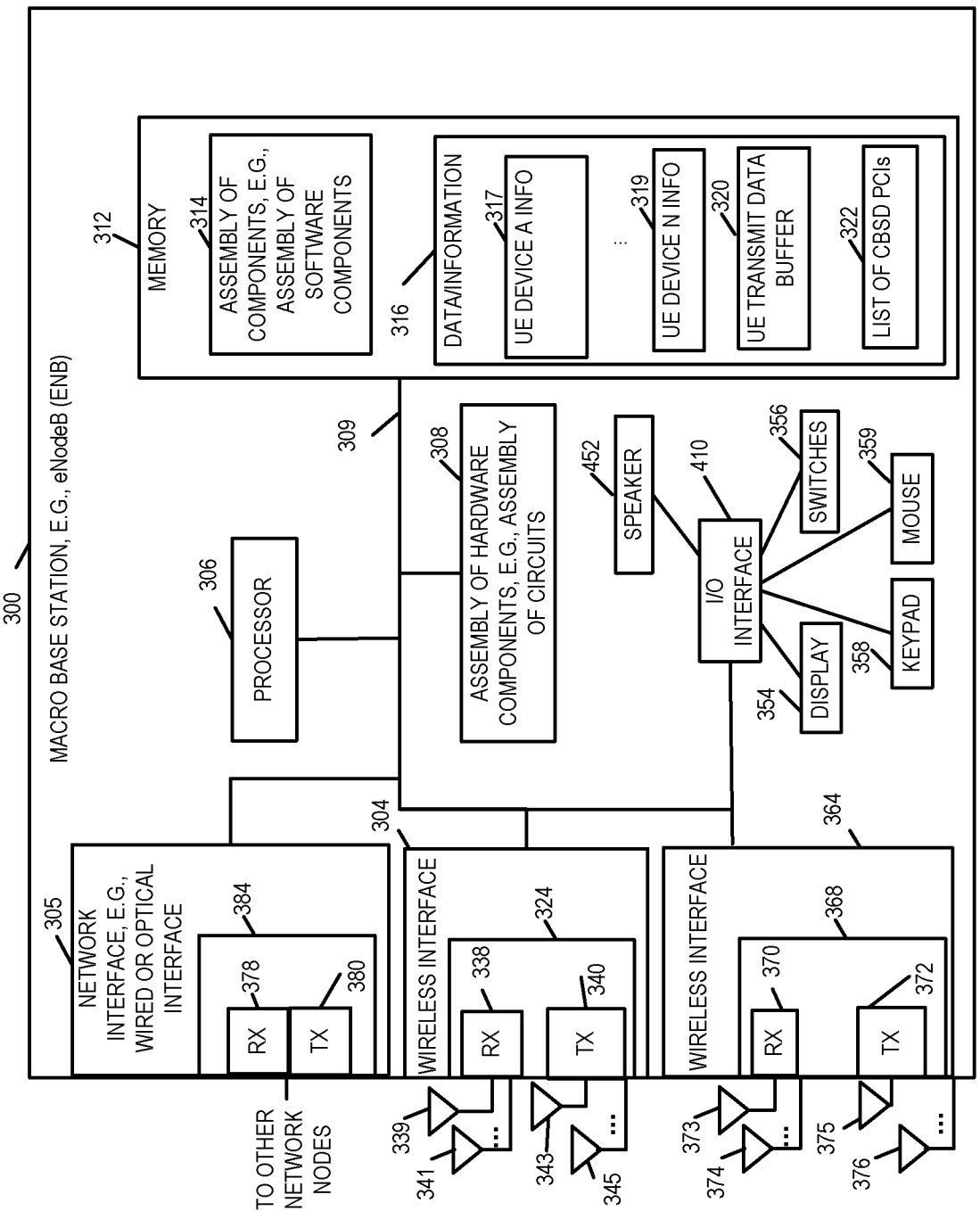
FIG. 3 illustrates details of an exemplary macro base station, e.g., LTE eNodeB, in accordance with one embodiment of the present invention.

FIG. 3 is a drawing of an exemplary macro base station 300, e.g., an eNodeB, in accordance with an exemplary embodiment. The macro base station 300 includes the capabilities of a 4G Long Term Evolution eNodeB, a first wireless interface 304, a second wireless interface 364, a network interface 305, e.g., a wired or optical interface, a processor 306, e.g., a CPU, an assembly of hardware components 308, e.g., an assembly of circuits, and I/O interface 310 and memory 312 coupled together via a bus 309 over which the various elements may interchange data and information. The macro base station 400 further includes a speaker 352, a display 353, switches 356, keypad 358 and mouse 359 coupled to I/O interface 310, via which the various I/O devices (352, 354, 356, 358, 359) may communicate with other elements (304, 306, 308, 312) of the macro base station 400. Network interface 305 includes a receiver 378 and a transmitter 380. In some embodiments, receiver 378 and transmitter 380 are part of a transceiver 384. Wireless interface 304 includes a wireless receiver 338 and a wireless transmitter 340. In some embodiments, receiver 338 and transmitter 340 are part of a transceiver 324. In various embodiments, wireless interface 304 includes a plurality of wireless receivers and a plurality of wireless transmitters. Wireless receiver 338 is coupled to a plurality of receive antennas (receive antenna 1 339, . . . , receive antenna M 441), via which macro base station 400 can receive wireless signal from other wireless communications devices including a second wireless communications device, e.g., a UE device. Wireless transmitter 340 is coupled to a plurality of wireless transmit antennas (transmit antenna 1 343, . . . , transmit antenna N 345) via which the macro base station can transmit signals to other wireless communications devices including a second wireless communications device, e.g., a UE device.

Wireless interface 364 includes a wireless receiver 370 and a wireless transmitter 374. In some embodiments, receiver 370 and transmitter 372 are part of a transceiver 368. In various embodiments, wireless interface 364 includes a plurality of wireless receivers and a plurality of wireless transmitters. Wireless receiver 370 is coupled to a plurality of receive antennas (receive antenna 1 373, . . . , receive antenna M 374), via which macro base station 300 can receive wireless signals from other wireless communications devices including a second wireless communications device, e.g., a CBSD device, another LTE macro base station (e.g., eNodeB), etc. Wireless transmitter 364 is coupled to a plurality of wireless transmit antennas (transmit antenna 1 375, . . . , transmit antenna N 376) via which the macro base station can transmit signals to other wireless communications devices including a second wireless communications device, e.g., a CBSD device, a LTE macro base station (e.g., eNodeB), etc.

In some embodiments, the first wireless interface is assigned to service communications between the macro base station and user equipment devices in its coverage area while the second wireless interface is assigned to service device to device communications between the macro base station and a CBSD over which an X2 connection may be and in some embodiments is established. In some embodiments, only a single wireless interface is utilized.

Memory 312 includes an assembly of component 314, e.g., an assembly of software components, and data/information 316. Data/information 316 includes UE device information corresponding to a plurality of user equipment devices (UE device A information 317, . . . , UE device N information 319 where A to N are the UE devices being serviced by the macro base station 400 for example UE 1 110 as shown in FIG. 1. Data/information 316 may also include device to device configuration information. The macro base station 102 of system 100 may be, and in some embodiments is, implemented in accordance with macro base station 300. In such embodiments, the macro base station has four antennas for transmitting to the UE device. The macro base station 1202 of system 1200 may be, and in some embodiments is, implemented in accordance with macro base station 300. In such embodiments, the macro base station has four antennas for transmitting to the UE device.

Figure 4:
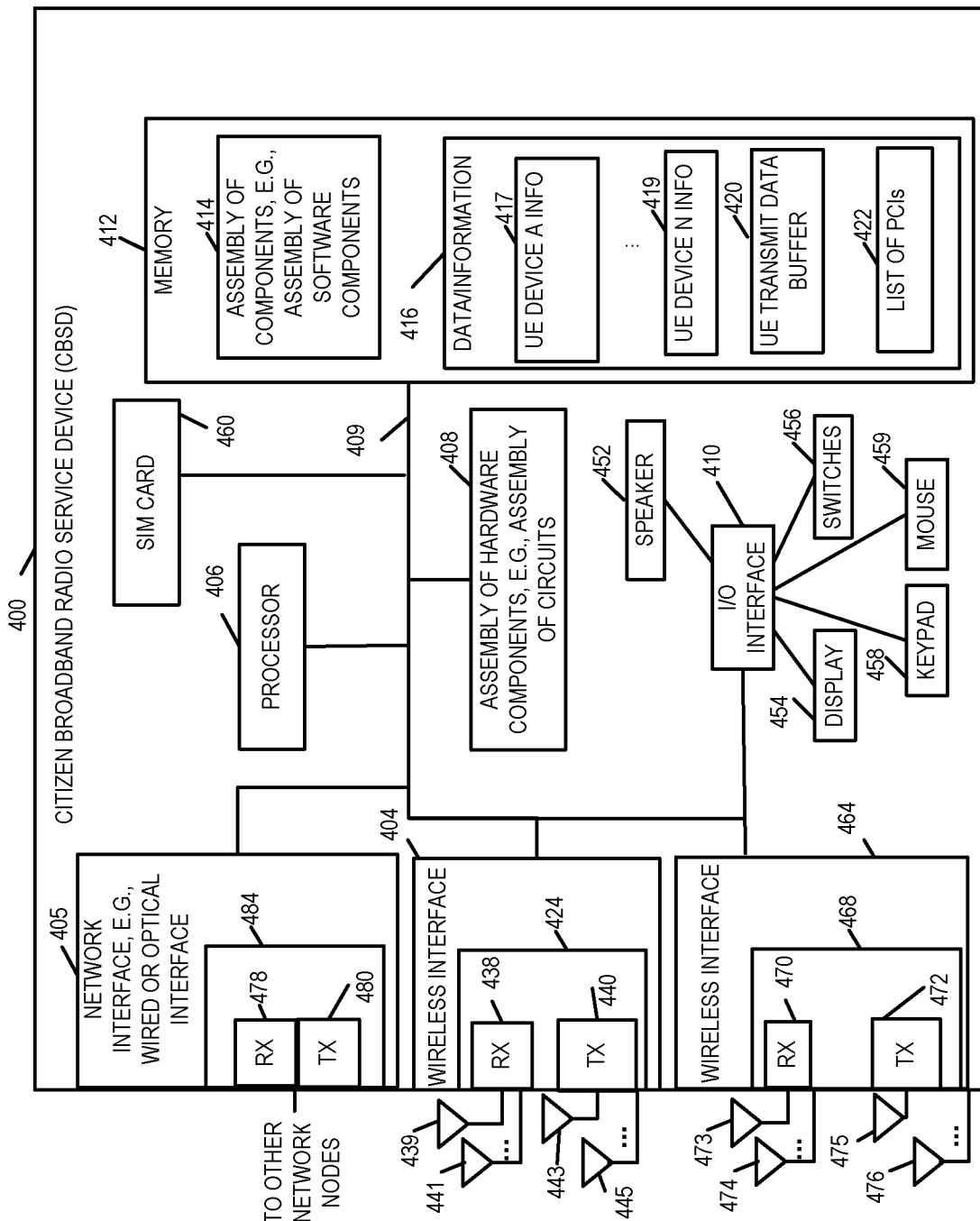
FIG. 4 illustrates details of an exemplary Citizens Broadband Radio Service Device (CBSD) in accordance with one embodiment of the present invention.

FIG. 4 is a drawing of an exemplary Citizens Broadband Radio Service Device (CBSD) 400 in accordance with an exemplary embodiment. The CBSD device 400 includes the capabilities of a CBSD as defined by the Federal Communications Commission's Rules with Regard to Commercial Operations in the 3550-3650 MHz Band. Exemplary CBSD device 400 includes an optional subscriber identification module (SIM) 460, also known as a SIM card, a first wireless interface 404, a second wireless interface 464, a network interface 405, e.g., a wired or optical interface, a processor 406, e.g., a CPU, an assembly of hardware components 408, e.g., an assembly of circuits, and I/O interface 410 and memory 412 coupled together via a bus 409 over which the various elements may interchange data and information. CBSD device 400 further includes a speaker 452, a display 453, switches 456, keypad 458 and mouse 459 coupled to I/O interface 410, via which the various I/O devices (452, 454, 456, 458, 459) may communicate with other elements (404, 406, 408, 412) of the CBSD device 400. Network interface 405 includes a receiver 478 and a transmitter 480. In some embodiments, receiver 478 and transmitter 480 are part of a transceiver 484. Wireless interface 404 includes a wireless receiver 438 and a wireless transmitter 440. In some embodiments, receiver 438 and transmitter 440 are part of a transceiver 424. In various embodiments, wireless interface 404 includes a plurality of wireless receivers and a plurality of wireless transmitters. Wireless receiver 438 is coupled to a plurality of receive antennas (receive antenna 1 439, . . . , receive antenna M 441), via which CBSD device 400 can receive wireless signal from other wireless communications devices including a second wireless communications device, e.g., a UE device. Wireless transmitter 440 is coupled to a plurality of wireless transmit antennas (transmit antenna 1 443, . . . , transmit antenna N 445) via which the CBSD 400 can transmit signals to other wireless communications devices including a second wireless communications device, e.g., a UE device.

Wireless interface 464 includes a wireless receiver 470 and a wireless transmitter 474. In some embodiments, receiver 470 and transmitter 472 are part of a transceiver 468. In various embodiments, wireless interface 464 includes a plurality of wireless receivers and a plurality of wireless transmitters. Wireless receiver 470 is coupled to a plurality of receive antennas (receive antenna 1 473, . . . , receive antenna M 474), via which CBSD device 400 can receive wireless signal from other wireless communications devices including a second wireless communications device, e.g., another CBSD device, a LTE macro base station (e.g., eNodeB), etc. Wireless transmitter 464 is coupled to a plurality of wireless transmit antennas (transmit antenna 1

475, . . . , transmit antenna N 476) via which the CBSD 400 can transmit signals to other wireless communications devices including a second wireless communications device, e.g., another CBSD device, a LTE macro base station (e.g., eNodeB), etc.

In some embodiments, the first wireless interface is assigned to service communications between the CBSD and user equipment devices in its coverage area while the second wireless interface is assigned to service device to device communications between the CBSD 400 and another CBSD. In some embodiments, only a single wireless interface is utilized. In such cases, the single wireless interface includes a plurality of antennas with at least one of plurality of antennas being assigned to a first group of antennas and at least one of the plurality of antennas being assigned to a second group of antennas. The first group of antennas being used or reserved to provide communications between the CBSD 400 and the UEs in its coverage areas and second group of antennas being used or reserved to be used for providing device to device communications.

Memory 412 includes an assembly of component 414, e.g., an assembly of software components, and data/information 416. Data/information 416 includes UE device information corresponding to a plurality of user equipment devices (UE device A information 417, . . . , UE device N information 419 where A to N are the UE devices being serviced by the CBSD for example CBSD 1 102 services UE 1 . . . . UE 3 as shown in FIG. 1. Data/information 416 may also include device to device configuration information, estimated and/or backhaul capacity requirements information, estimated D2D resource requirements information, measured D2D resource utilization information and reports.

Figure 12:
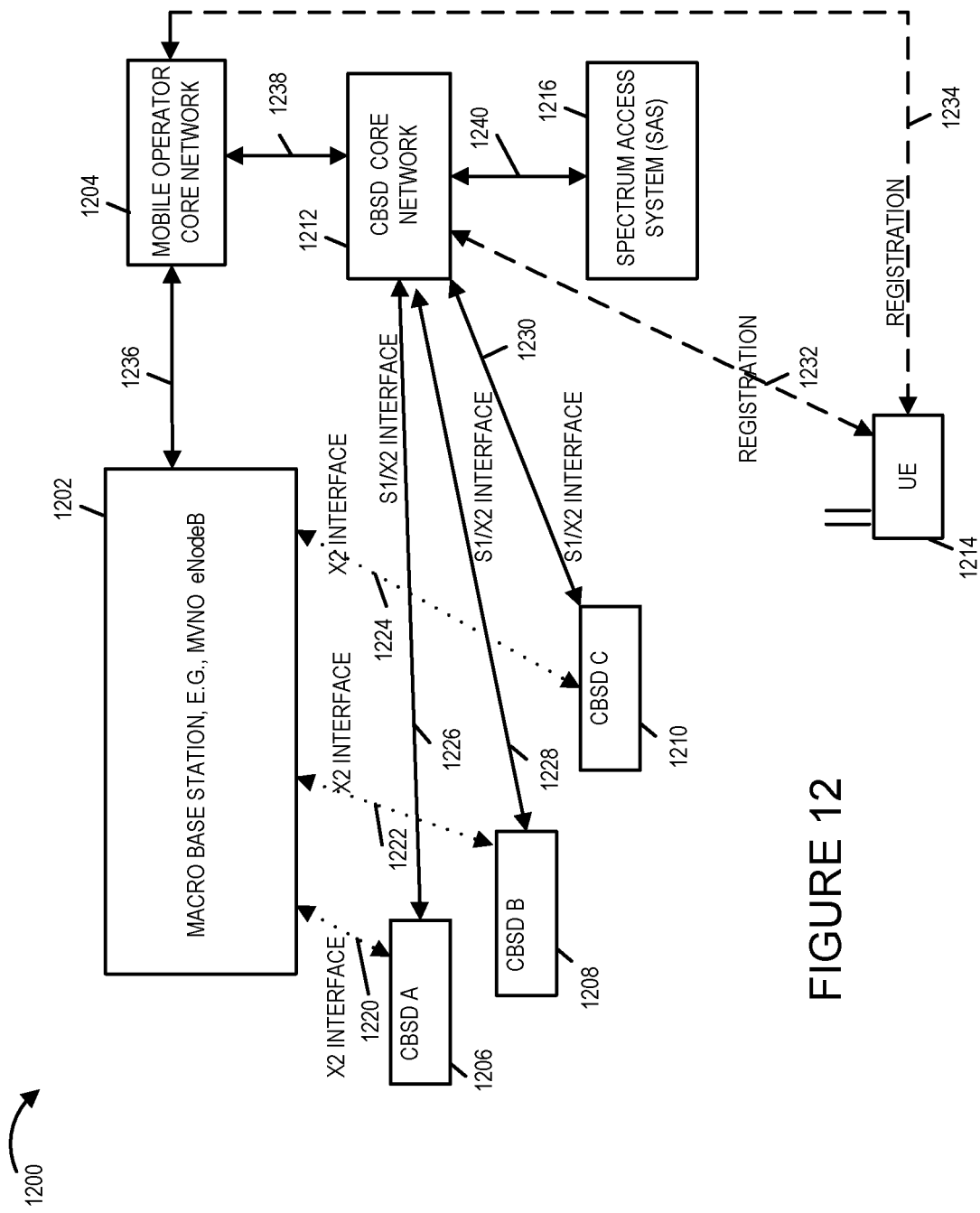
FIG. 12 illustrates an exemplary communications system in accordance with an embodiment of present invention.
Figure 13:
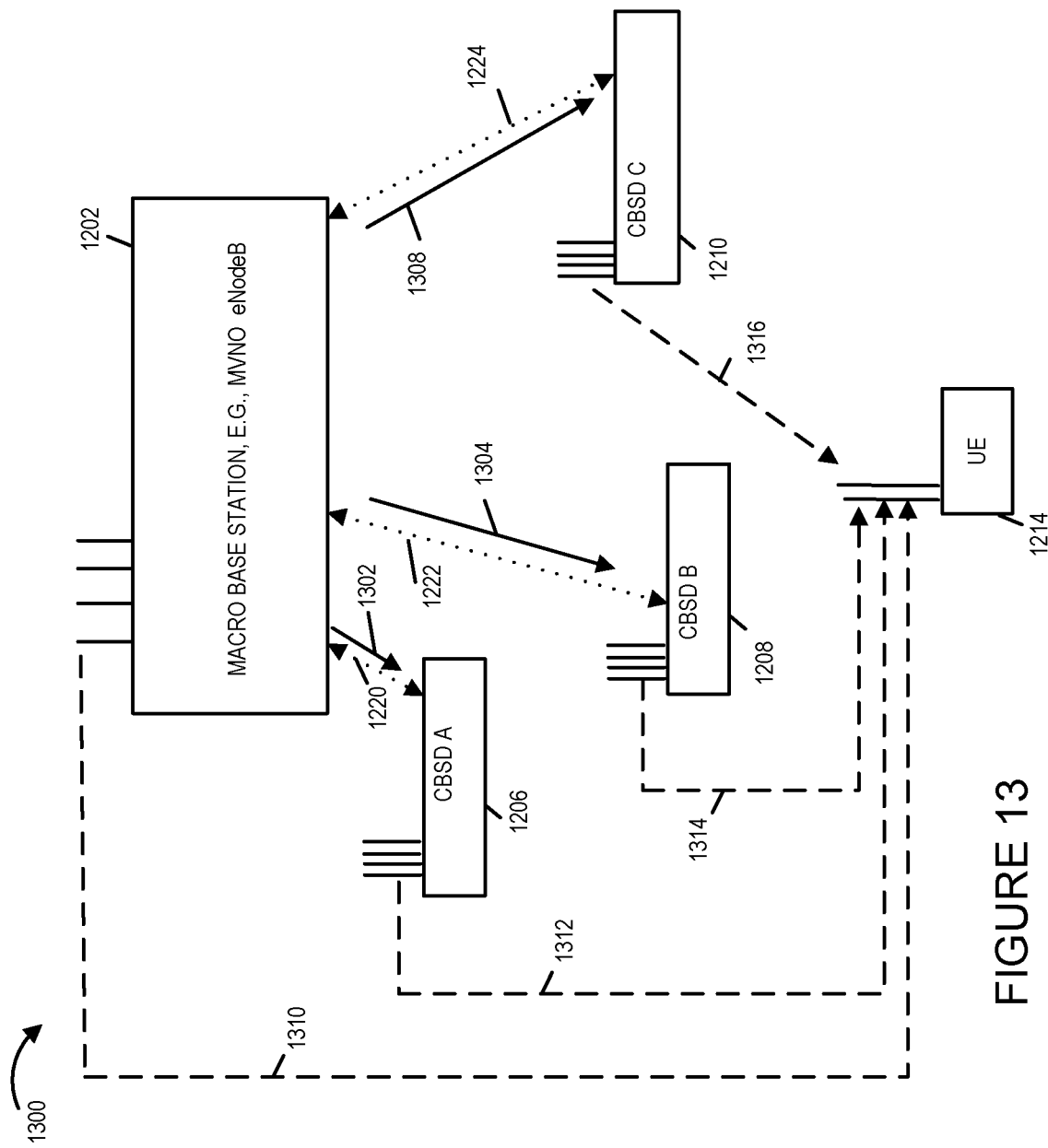
FIG. 13 illustrates the use of the multiple macro base station and CBSDs antennas to communicate with the user equipment device of the exemplary communications system illustrated in FIG. 12.

The SIM card 460 is an integrated circuit that securely stores an international mobile subscriber identity (IMSI) number and its related key, which are used to identify and authenticate the CBSD. Through the use of the SIM card 460 the CBSD appears as a mobile user equipment device (UE) to a Mobile Virtual Network Operator (MVNO) network. CBSD 1 102 and CBSD 2 104 of FIGS. 1, 2, and 3 may be, and in some embodiments are, implemented in accordance with CBSD 400. In some embodiments, CBSD 1 102 which does not have a backhaul connection does not include a network interface or in some embodiments the network interface is not connection to a communications link. In some embodiments, the CBSDs illustrated in FIGS. 1, 12, 13 are implemented in accordance with the exemplary CBSD 400 illustrated in FIG. 4. In such cases the number of antennas for transmitting to the UE is shown and/or discussed in connection with FIGS. 1, 12, and 13.

Figure 5:
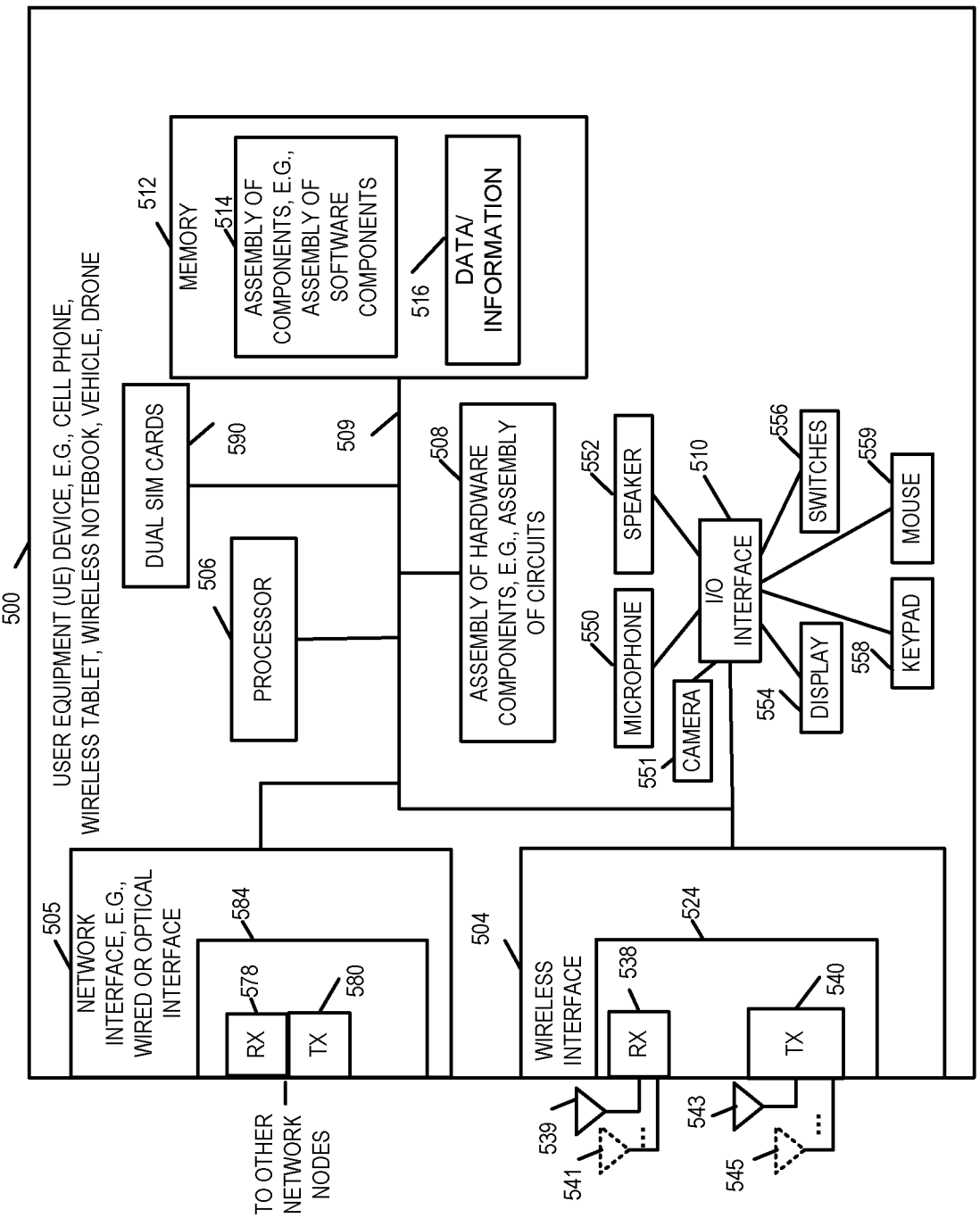
FIG. 5 illustrates details of an exemplary User Equipment (UE) device in accordance with one embodiment of the present invention.

FIG. 5 is a drawing of an exemplary user equipment (UE) device 500 in accordance with an exemplary embodiment. UE device 500 is, e.g., a mobile device such as a cell phone, a smart phone, wireless tablet or wireless notebook. UE device 500, in some embodiments, includes Long Term Evolution (LTE), e.g., 4G LTE, mobile device capabilities. Exemplary UE device 500 includes a wireless interface 504, a processor 506, e.g., a CPU, an assembly of hardware components 508, e.g., an assembly of circuits, and I/O interface 510, dual SIM cards 590, and memory 512 coupled together via a bus 509 over which the various elements may interchange data and information. UE device 500 further includes a microphone 550, camera 551, speaker 552, a display 553, e.g., a touch screen display, switches 556, keypad 558 and mouse 559 coupled to I/O interface 510, via which the various I/O devices (550, 551, 552, 554, 556, 558, 559) may communicate with other elements (504, 506, 508, 512) of the UE device. Network interface 505 includes a receiver 578 and a transmitter 580. In some embodiments, receiver 578 and transmitter 580 are part of a transceiver 584. Wireless interface 504 includes a wireless receiver 538 and a wireless transmitter 540. In some embodiments, receiver 538 and transmitter 540 are part of a transceiver 524. In various embodiments, wireless interface 504 includes a plurality of wireless receivers and a plurality of wireless transmitters. Wireless receiver 538 is coupled to one or more receive antennas (receive antenna 1 539, . . . , receive antenna M 541), via which UE device 500 can receive wireless signals from other wireless communications devices including, e.g., a CBSD device such as CBSD 400. Wireless transmitter 540 is coupled to one or more wireless transmit antennas (transmit antenna 1 543, . . . , transmit antenna N 545) via which the UE device 500 can transmit signals to other wireless communications device including a first wireless communications device, e.g., a CBSD 400. Memory 512 includes an assembly of components 514, e.g., an assembly of software components, and data/information 516. The dual Subscriber Identity Module (SIM) cards include a first SIM with a first Subscriber Identity for communicating with a first network, e.g., MVNO LTE macro network, and a second SIM with a second Subscriber Identity for communicating with a second network, e.g., CBRS network. The user equipment device UE 1 110 of system 100 and the user equipment device 1214 of system 1200 may be, and in some embodiments are, implemented in accordance with exemplary user equipment device 500 with the number of antennas of the UE as described in connection with the UE 1 110 or UE 1214.

Figure 6:
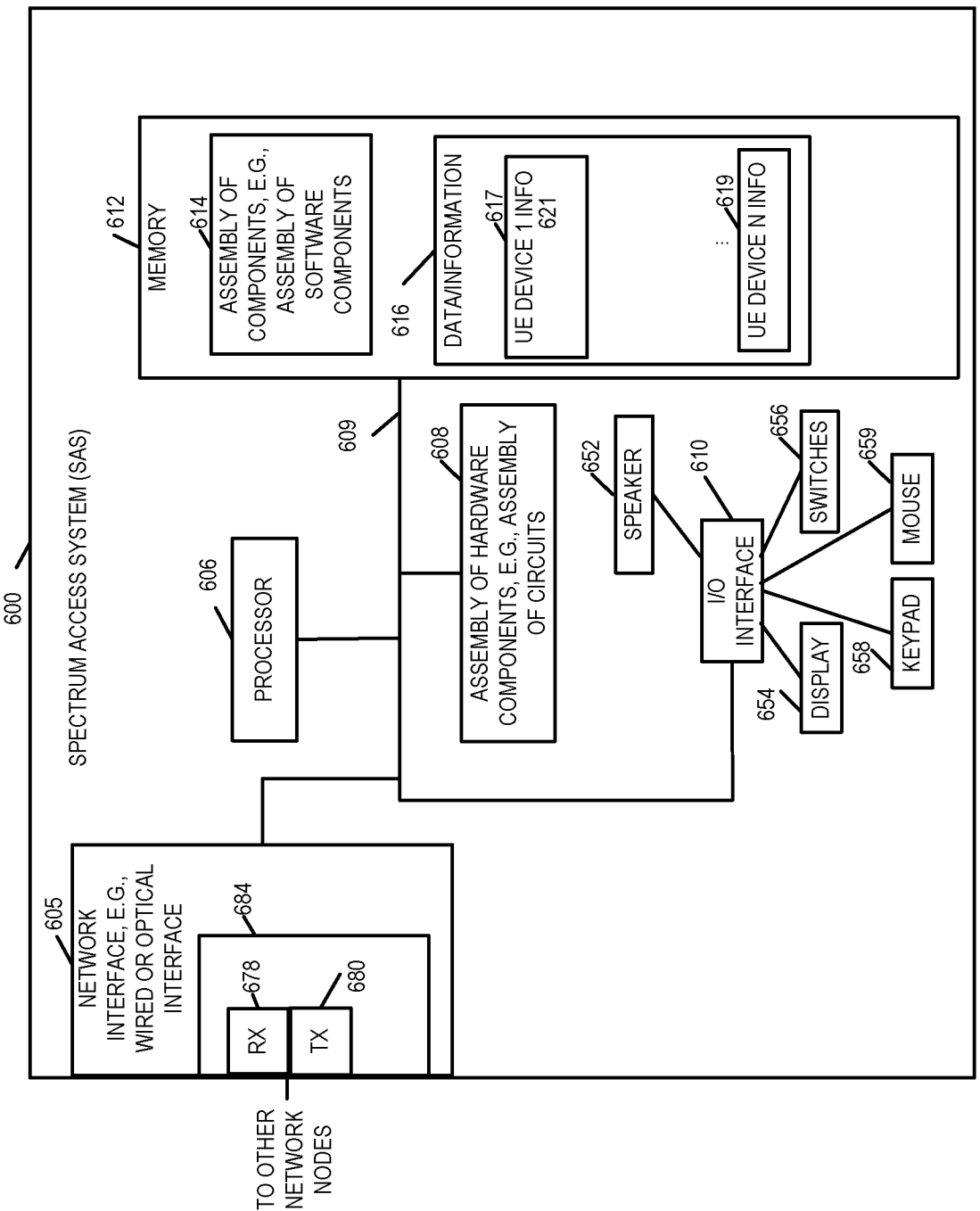
FIG. 6 illustrates details of an exemplary Spectrum Access System (SAS) in accordance with one embodiment of the present invention.

FIG. 6 is a drawing of an exemplary Spectrum Access System (SAS) device 600 in accordance with an exemplary embodiment. The SAS 600 includes the capabilities of a SAS as defined by the Federal Communications Commission's Rules with Regard to Commercial Operations in the 3550-3650 MHz Band. Exemplary SAS device 600 includes a network interface 605, e.g., a wired or optical interface, a processor 606, e.g., a CPU, an assembly of hardware components 608, e.g., an assembly of circuits, and I/O interface 610 and memory 612 coupled together via a bus 609 over which the various elements may interchange data and information. SAS 600 further includes a speaker 652, a display 653, switches 656, keypad 658 and mouse 659 coupled to I/O interface 610, via which the various I/O devices (652, 654, 656, 658, 659) may communicate with other elements (606, 608, 612) of the SAS 600. Network interface 605 includes a receiver 678 and a transmitter 680. The network interface 605 is typically used to communicate with other SAS devices and CBSD devices. In some embodiments, receiver 678 and transmitter 680 are part of a transceiver 684. Memory 612 includes an assembly of component 614, e.g., an assembly of software components, and data/information 616. Data/information 616 includes CBSD device information corresponding to a plurality of CBSD devices (e.g., CBSD device 1 106 information, . . . , CBSD device X 108 information) and information corresponding to one or more macro base stations, (e.g., macro base station 102. In some embodiments, SAS 1 116 is implemented in accordance with SAS 600. In some embodiments, SAS 1216 of system 1200 is implemented in accordance with SAS 600 illustrated in FIG. 6.

Figure 7:
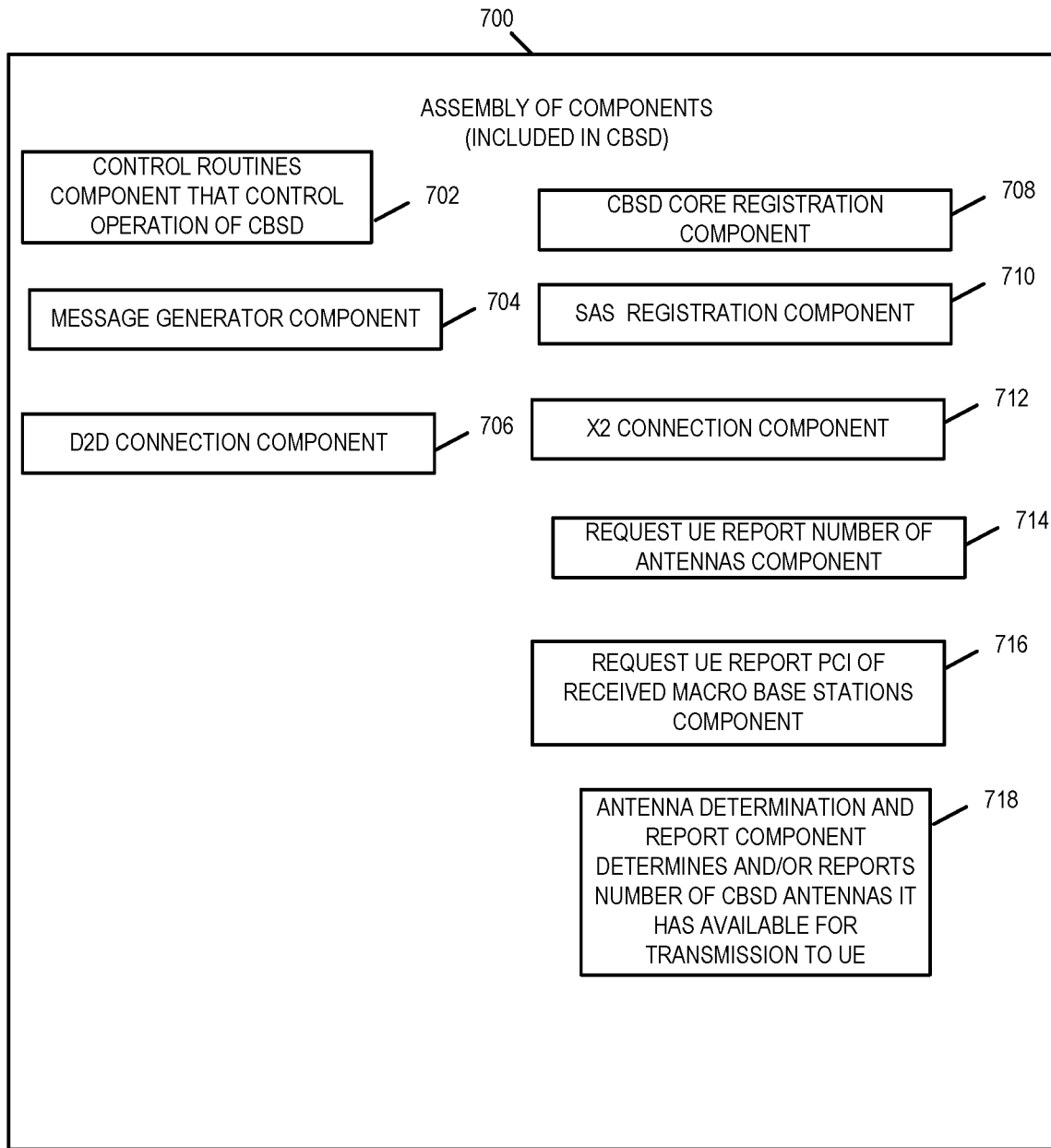
FIG. 7 illustrates an exemplary assembly of components for a CBSD in accordance with an embodiment of the present invention.

FIG. 7 is a drawing of an exemplary assembly of components 700 which may be included in an exemplary CBSD device, e.g., exemplary CBSD 400 of FIG. 4, in accordance with an exemplary embodiment. The components in the assembly of components 700 can, and in some embodiments are, implemented fully in hardware within a processor, e.g., processor 406, e.g., as individual circuits. The components in the assembly of components 700 can, and in some embodiments are, implemented fully in hardware within the assembly of hardware components 408, e.g., as individual circuits corresponding to the different components. In other embodiments some of the components are implemented, e.g., as circuits, within processor 406 with other components being implemented, e.g., as circuits within assembly of components 408, external to and coupled to the processor 406. As should be appreciated the level of integration of components on the processor and/or with some components being external to the processor may be one of design choice. Alternatively, rather than being implemented as circuits, all or some of the components may be implemented in software and stored in the memory 412 of the CBSD device 400, with the components controlling operation of CBSD device 400 to implement the functions corresponding to the components when the components are executed by a processor e.g., processor 406. In some such embodiments, the assembly of components 700 is included in the memory 412 as assembly of software components 414. In still other embodiments, various components in assembly of components 700 are implemented as a combination of hardware and software, e.g., with another circuit external to the processor providing input to the processor which then under software control operates to perform a portion of a component's function.

When implemented in software the components include code, which when executed by a processor, e.g., processor 406, configure the processor to implement the function corresponding to the component. In embodiments where the assembly of components 700 is stored in the memory 412, the memory 412 is a computer program product comprising a computer readable medium comprising code, e.g., individual code for each component, for causing at least one computer, e.g., processor 406, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the CBSD device 400 or elements therein such as the processor 406, to perform the functions of corresponding steps illustrated and/or described in the method of one or more of the flowcharts, signaling diagrams and/or described with respect to any of the Figures. Thus the assembly of components 700 includes various components that perform functions of corresponding one or more described and/or illustrated steps of an exemplary method.

Assembly of components 700 includes a control routines component 702, message generator component 704, device to device connection component 706, a CBSD network core registration component 708, SAS registration component 710, X2 connection component 712, request UE report number of antennas component 714, request UE report PCIs of macro base stations from which signals are being received component 716, and component for determining and/or reporting number of CBSD antennas available for communication with UE.

The control routines component 702 is configured to control operation of the CBSD. The message generator component 704 is configured to generate messages for transmission to other devices including requests, response and report messages, e.g., registration request messages, X2 connection setup message, device to device setup messages, connection and teardown message, command messages to be sent to UE, messages to be sent to SAS, data blocks to be sent to the UE.

The device to device connection component 706 controls the CBSD to establish, maintain, and tear down device to device connections such as the device to device connection between CBSD 1 106 and CBSD X 108 or CBSD 1 106 and macro base station 102. The CBSD core registration component 708 registers the CBSD with the CBSD operator network core. SAS registration component 710 registers the CBSD with the SAS, e.g., SAS 1 116. The X2 connection component 212 establishes X2 connection e.g., with the macro base station 102 or other devices, e.g., other CBSDs. The request UE report number of antennas component 714 generates and handles requests to be sent to UEs requesting that the receiving UE report the number of antennas it has for communications, e.g., for receiving data communications. The request UE report PCI of received macro base stations component 716 generates and handles requests to be sent to UE requesting the UE report the PCIs of all macro base stations from which the UE is receiving a signal. The antenna determination and report component 718 determines and/or reports the number of antennas the CBSD has available for transmitting data to a UE.

Figure 15:
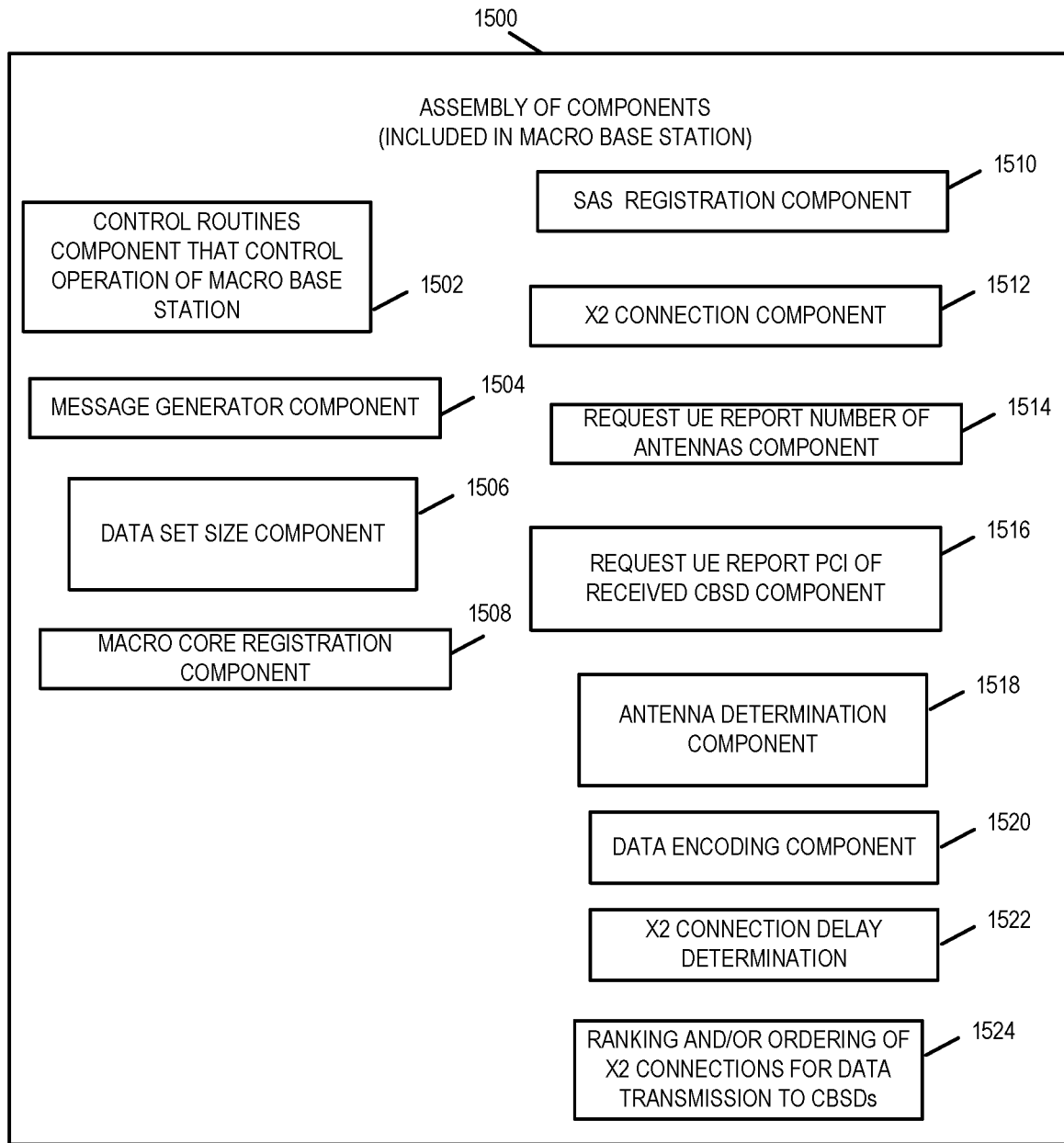
FIG. 15 illustrates an exemplary assembly of components for a macro base station in accordance with an embodiment of the present invention.

FIG. 15 is a drawing of an exemplary assembly of components 1500 which may be included in an exemplary CBSD device, e.g., exemplary CBSD 300 of FIG. 3, in accordance with an exemplary embodiment. The components in the assembly of components 1500 can, and in some embodiments are, implemented fully in hardware within a processor, e.g., processor 306, e.g., as individual circuits. The components in the assembly of components 1500 can, and in some embodiments are, implemented fully in hardware within the assembly of hardware components 308, e.g., as individual circuits corresponding to the different components. In other embodiments some of the components are implemented, e.g., as circuits, within processor 306 with other components being implemented, e.g., as circuits within assembly of components 408, external to and coupled to the processor 306. As should be appreciated the level of integration of components on the processor and/or with some components being external to the processor may be one of design choice. Alternatively, rather than being implemented as circuits, all or some of the components may be implemented in software and stored in the memory 212 of the CBSD device 300, with the components controlling operation of CBSD device 300 to implement the functions corresponding to the components when the components are executed by a processor e.g., processor 306. In some such embodiments, the assembly of components 300 is included in the memory 312 as assembly of software components 414. In still other embodiments, various components in assembly of components 300 are implemented as a combination of hardware and software, e.g., with another circuit external to the processor providing input to the processor which then under software control operates to perform a portion of a component's function.

When implemented in software the components include code, which when executed by a processor, e.g., processor 306, configure the processor to implement the function corresponding to the component. In embodiments where the assembly of components 1500 is stored in the memory 312, the memory 312 is a computer program product comprising a computer readable medium comprising code, e.g., individual code for each component, for causing at least one computer, e.g., processor 306, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 15 control and/or configure the macro base station 300 or elements therein such as the processor 306, to perform the functions of corresponding steps illustrated and/or described in the method of one or more of the flowcharts, signaling diagrams and/or described with respect to any of the Figures. Thus the assembly of components 1500 includes various components that perform functions of corresponding one or more described and/or illustrated steps of an exemplary method.

Assembly of components 1500 includes a control routines component '502, message generator component 1504, data set size component 1506, a macro network core registration component 1508, SAS registration component 1510, X2 connection component 1512, request UE report number of antennas component 1514, request UE report PCIs of CBSDs from which signals are being received component 1516, antenna determination component 1518, and a data encoding component 1520, X2 connection delay component 1522, ranking and/or ordering of X2 connections for data transmission to CBSDs component 1524.

The control routines component 1502 is configured to control operation of the macro base station. The message generator component 1504 is configured to generate messages for transmission to other devices including requests, response and report messages, e.g., registration request messages, X2 connection setup message, device to device setup messages, connection and teardown message, command messages to be sent to UE, messages to be sent to SAS, data blocks to be sent to UEs.

The data set size component 1506 determines the data set size to be requested from the macro network based on the number of antennas determined as being available for use in communicating to the UE to which the data is to be provided. The macro network core registration component 1508 registers the macro base station with the macro core network, e.g., the macro core network registrar of the macro network. SAS registration component 1510 registers the macro base station with the SAS, e.g., SAS 1 116. The X2 connection component 1512 establishes X2 connection e.g., with the CBSDs and/or other devices, e.g., other macro base stations, network components. The request UE report number of antennas component 1514 generates and handles requests to be sent to UEs requesting that the receiving UE report the number of antennas it has for communications, e.g., for receiving data communications. The request UE report PCI of received CBSDs component 1516 generates and handles requests to be sent to UEs requesting the UE report the PCIs of all CBSDs from which the UE is receiving a signal. The antenna determination component 1518 determines the number of antennas available for transmitting data to a UE, e.g., macro base station and CBSDs' antennas which are available for transmitting data to a UE. The data encoding component 1520 encodes blocks or segments of data to be sent to a UE device in a manner in which each block is coded so that it is independent of the other data blocks of data for purposes of transmission to a UE. The data encoding component 1520 in some embodiments uses orthogonal coding. The X2 connection delay component 1522 determines the X2 connection/link delay for each of the X2 connections established between the macro base station and a CBSD. In some embodiments X2 connection delay component 1522 determines the X2 connection/link delay based on the measured average X2 connection/link latency measured using ping packets. The ranking and/or ordering of X2 connections for data transmission to CBSDs component 1524 ranks the X2 connections to be used to transmit data blocks to CBSDs for transmission by the CBSDs to a UE based on the determined X2 connection link latency and orders the data block transmission based on the X2 connection/link latency. For example, X2 connections with larger X2 delays or latencies will be ranked and then ordered so that data is transmitted over those X2 connections before transmission of data over X2 connections which have smaller X2 connection/link delays or latencies.

Figure 8:
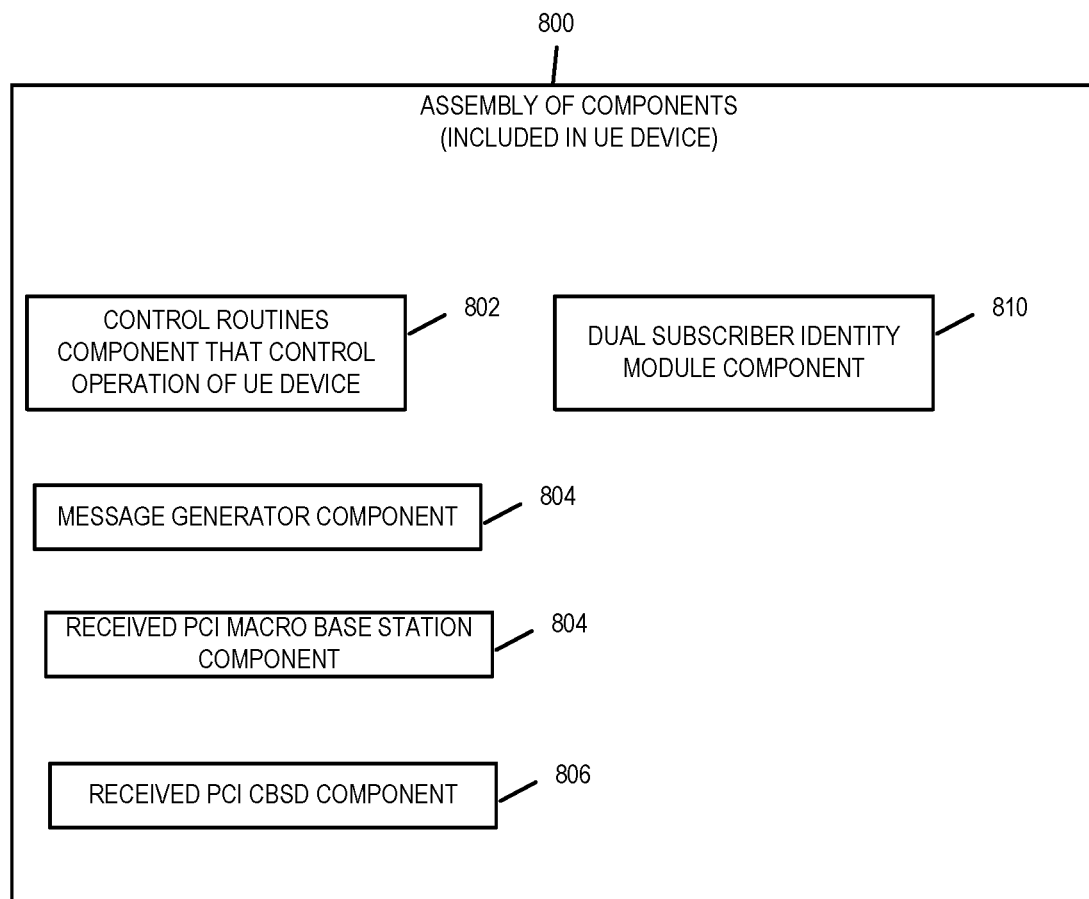
FIG. 8 illustrates an exemplary assembly of components for a user equipment device in accordance with an embodiment of the present invention.

FIG. 8 is a drawing of an exemplary assembly of components 800 which may be included in an exemplary user equipment (UE) device, e.g., UE device 500 of FIG. 5, in accordance with an exemplary embodiment. The components in the assembly of components 800 can, and in some embodiments are, implemented fully in hardware within a processor, e.g., processor 506, e.g., as individual circuits. The components in the assembly of components 800 can, and in some embodiments are, implemented fully in hardware within the assembly of hardware components 508, e.g., as individual circuits corresponding to the different components. In other embodiments some of the components are implemented, e.g., as circuits, within processor 506 with other components being implemented, e.g., as circuits within assembly of components 508, external to and coupled to the processor 506. As should be appreciated the level of integration of components on the processor and/or with some components being external to the processor may be one of design choice. Alternatively, rather than being implemented as circuits, all or some of the components may be implemented in software and stored in the memory 512 of the UE device 500, with the components controlling operation of UE device 500 to implement the functions corresponding to the components when the components are executed by a processor e.g., processor 506. In some such embodiments, the assembly of components 800 is included in the memory 512 as assembly of software components 514. In still other embodiments, various components in assembly of components 800 are implemented as a combination of hardware and software, e.g., with another circuit external to the processor providing input to the processor which then under software control operates to perform a portion of a component's function. When implemented in software the components include code, which when executed by a processor, e.g., processor 506, configure the processor to implement the function corresponding to the component. In embodiments where the assembly of components 800 is stored in the memory 512, the memory 512 is a computer program product comprising a computer readable medium comprising code, e.g., individual code for each component, for causing at least one computer, e.g., processor 506, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 8 control and/or configure the UE device 500 or elements therein such as the processor 506, to perform the functions of corresponding steps illustrated and/or described in the method of one or more of the flowcharts, signaling diagrams and/or described with respect to any of the Figures. Thus the assembly of components 800 includes various components that perform functions of corresponding one or more described and/or illustrated steps of an exemplary method.

Assembly of components 800 includes a control routines component 802, a message generator component 804, a received PCI macro base station component 806, received PCI CBSD device component 808, and dual SIM component 810. The control routines component 802 is configured to control operation of the UE. The message generator component 804 is configured to generate messages for transmission to macro base stations and CBSD devices, e.g. session connection requests, service requests such as for example video content service requests, etc. The received PCI macro base station component 806 identifies the PCIs of macro base stations from which the UE is receiving signals. The received PCI CBSD component 808 identifies the PCIs of CBSD devices from which the UE is receiving signals. The dual subscriber identity module component 810 includes two subscriber identities the first identity allows it to communicate with devices and register with the macro network, e.g., base stations and registrar in the macro network, and the second identity allows it to communicate and register with devices in the CBRS network, e.g., CBSDs and CBRS registrar.

Figure 9:
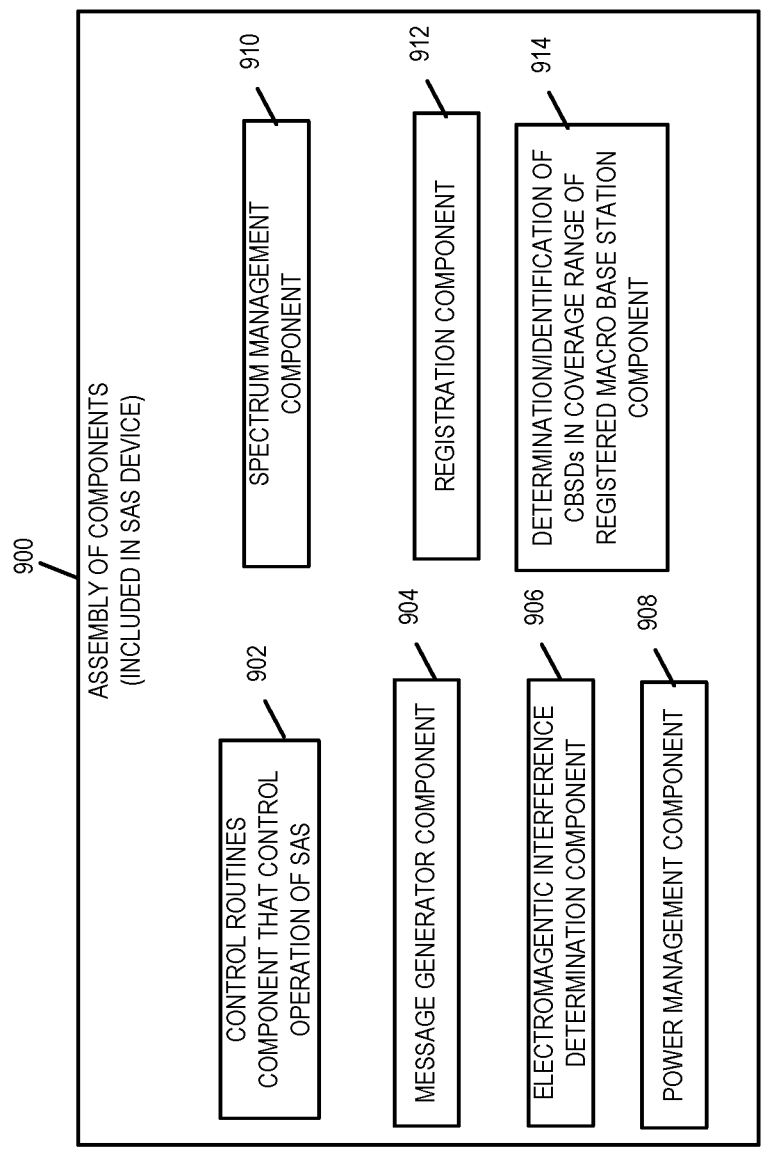
FIG. 9 illustrates an exemplary assembly of components for a SAS device in accordance with an embodiment of the present invention.

FIG. 9 is a drawing of an exemplary assembly of components 900 which may be included in an exemplary SAS device, e.g., exemplary SAS 600 of FIG. 6, in accordance with an exemplary embodiment. The components in the assembly of components 900 can, and in some embodiments are, implemented fully in hardware within a processor, e.g., processor 606, e.g., as individual circuits. The components in the assembly of components 900 can, and in some embodiments are, implemented fully in hardware within the assembly of hardware components 608, e.g., as individual circuits corresponding to the different components. In other embodiments some of the components are implemented, e.g., as circuits, within processor 606 with other components being implemented, e.g., as circuits within assembly of components 608, external to and coupled to the processor 606. As should be appreciated the level of integration of components on the processor and/or with some components being external to the processor may be one of design choice. Alternatively, rather than being implemented as circuits, all or some of the components may be implemented in software and stored in the memory 612 of the SAS 600, with the components controlling operation of SAS 600 to implement the functions corresponding to the components when the components are executed by a processor e.g., processor 606. In some such embodiments, the assembly of components 900 is included in the memory 612 as assembly of software components 614. In still other embodiments, various components in assembly of components 900 are implemented as a combination of hardware and software, e.g., with another circuit external to the processor providing input to the processor which then under software control operates to perform a portion of a component's function.

When implemented in software the components include code, which when executed by a processor, e.g., processor 606, configure the processor to implement the function corresponding to the component. In embodiments where the assembly of components 900 is stored in the memory 612, the memory 612 is a computer program product comprising a computer readable medium comprising code, e.g., individual code for each component, for causing at least one computer, e.g., processor 606, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 9 control and/or configure the SAS 600 or elements therein such as the processor 606, to perform the functions of corresponding steps illustrated and/or described in the method of one or more of the flowcharts, signaling diagrams and/or described with respect to any of the Figures. Thus the assembly of components 900 includes various components that perform functions of corresponding one or more described and/or illustrated steps of an exemplary method.

Assembly of components 900 includes a control routines component 902, a message generator component 904, an electromagnetic interference determination component 906, and a power management component 908, spectrum management component 910, registration component 912, and determination/identification of CBSDs in coverage range of registered macro base station component 914. The control routines component 902 is configured to control operation of the SAS. The message generator component 904 is configured to generate messages for transmission to CBSD devices, e.g., power down instruction messages. The electromagnetic interference determination component is configured to determine actual or potential electromagnetic interference to be caused by wireless, e.g., radio transmission from active CBSD devices or CBSDs devices which are to become active. The power management component 908 is configured to manage power transmission levels to maximize usage of spectrum while minimizing interference. The power management component 908 determines the power transmission level reductions for CBSDs when a new CBSD is activated and added to the CBRS network. The spectrum management component 910 is configured to manage the allocation of frequency spectrum in the CBRS network. The registration component 912 handles registration of macro base stations and CBSDs. The determination/identification of CBSDs in coverage range of registered macro base station component 914 determines and/or identifies the CBSDs in the coverage area or proximity of the CBSDs and determines/selects and instructs which CBSDs are to setup X2 connections with which registered macro base stations.

Figure 10A:
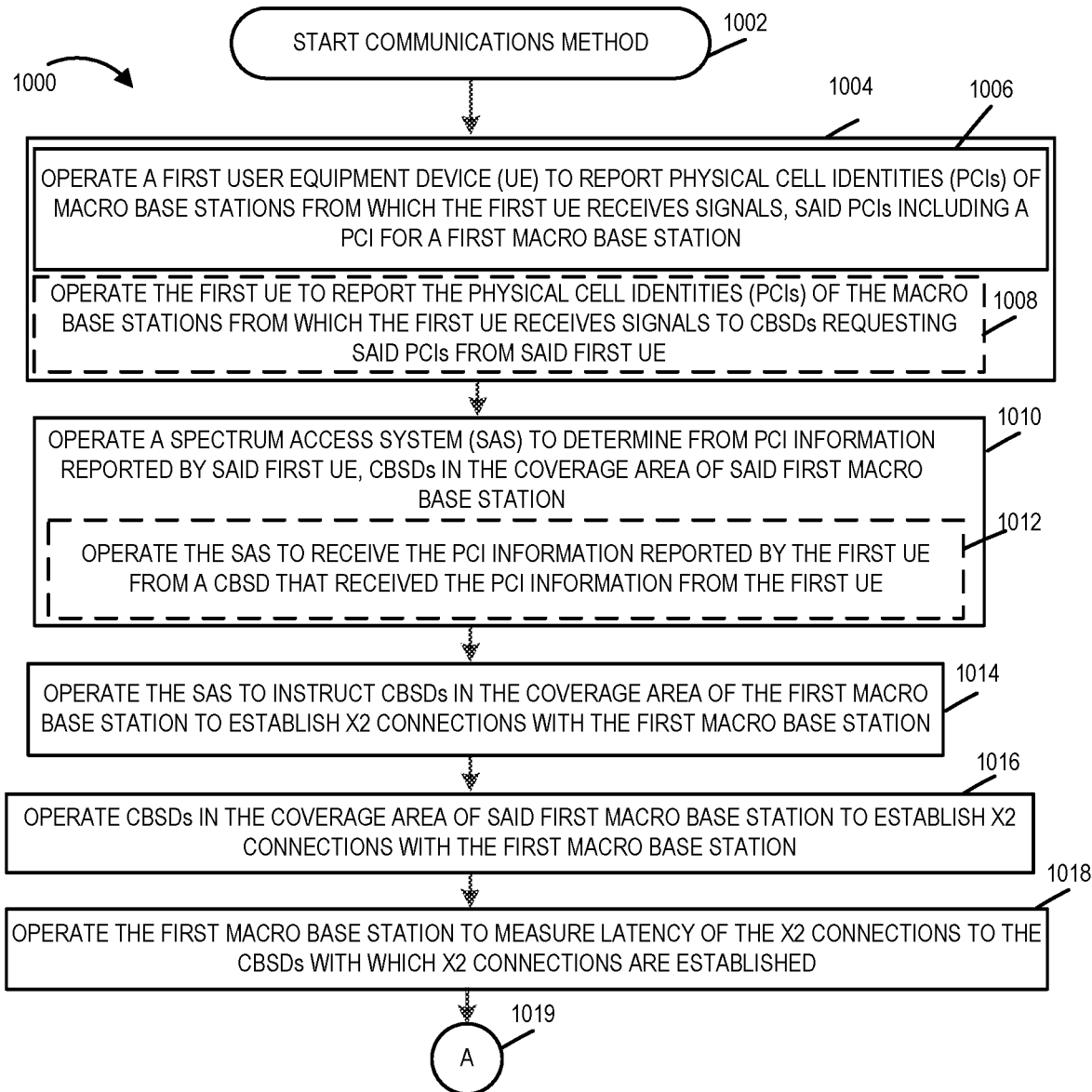
FIG. 10A illustrates the steps of the first part of an exemplary communications method in accordance with one embodiment of the present invention.
Figure 10B:
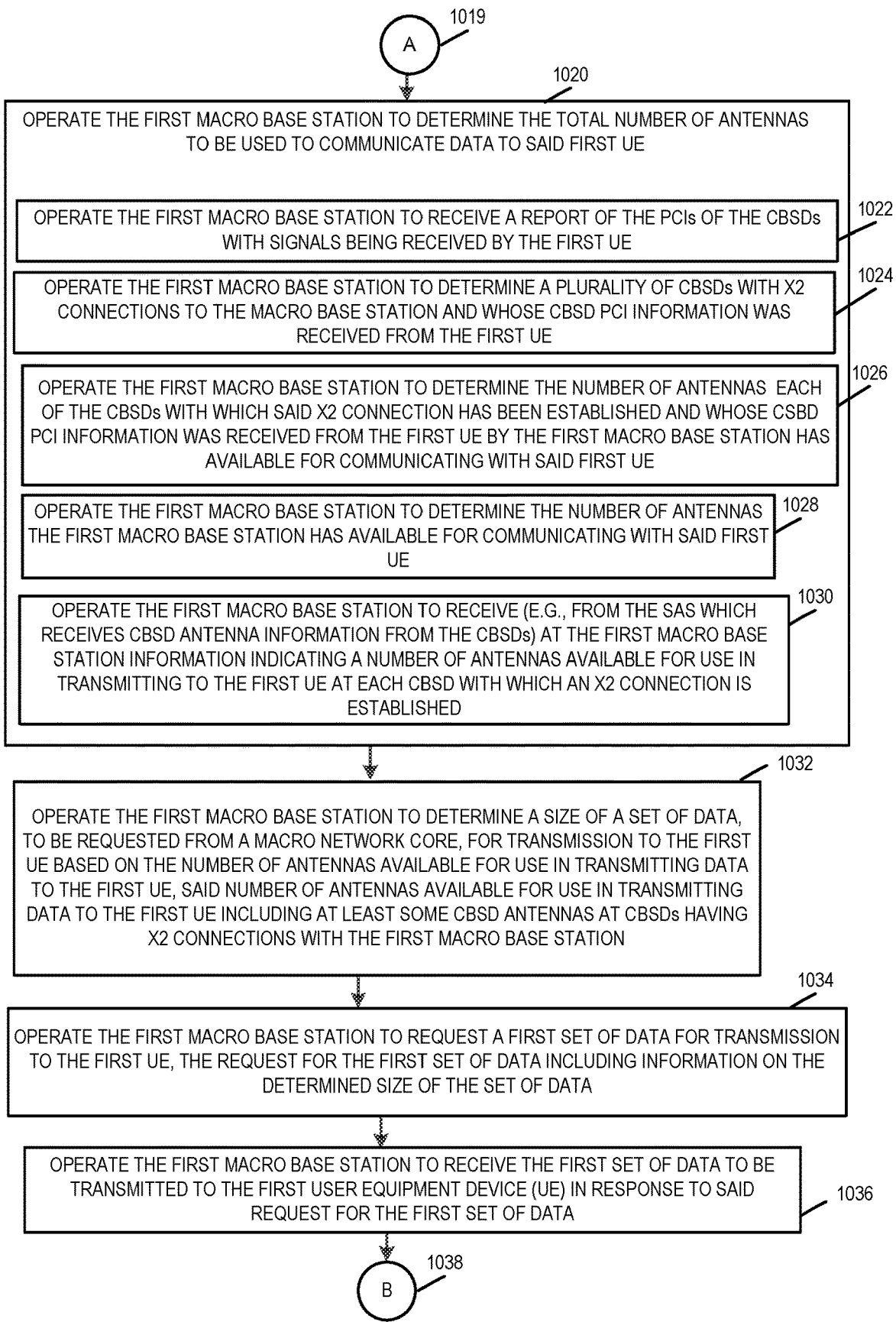
FIG. 10B illustrates the steps of the second part of an exemplary communications method in accordance with one embodiment of the present invention.
Figure 10C:
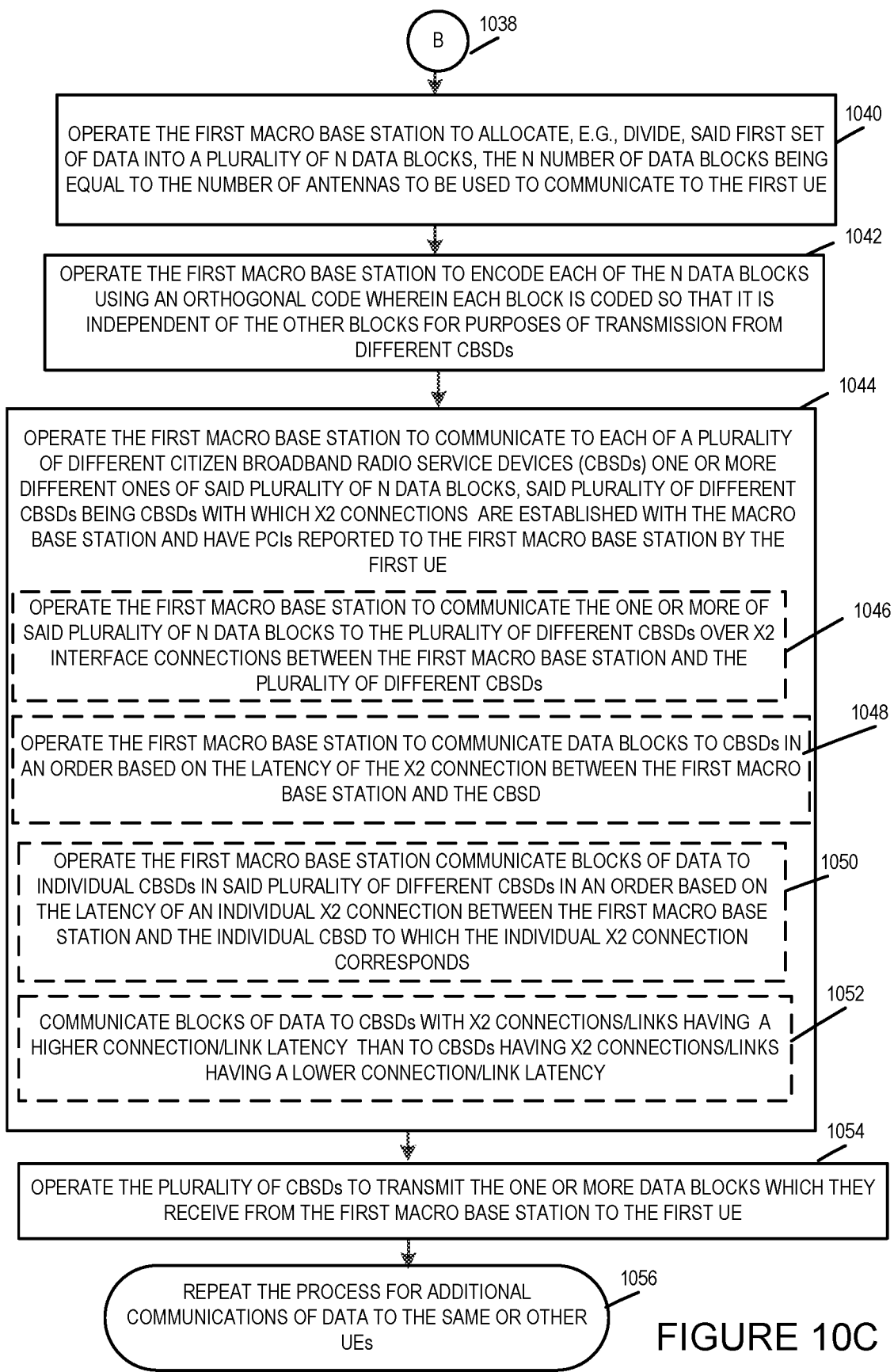
FIG. 10C illustrates the steps of a third part of an exemplary communications method in accordance with one embodiment of the present invention.

FIG. 10, which comprises the combination of FIGS. 10A, 10B, and 10C illustrates an exemplary communications method 1000 for providing data to a user equipment device through the use of multiple antennas located at a macro base station and one or more CBSDs devices. FIG. 10A illustrates the steps of the first part of the exemplary method 1000 in accordance with one embodiment of the present invention. FIG. 10B illustrates the steps of the second part of the exemplary method 1100 in accordance with one embodiment of the present invention. FIG. 10C illustrates the steps of the third part of the exemplary method 1000 in accordance with one embodiment of the present invention.

For explanatory purposes the exemplary method 1000 will be explained in connection with the exemplary communications system 100 illustrated in FIG. 1 although it should be understand that the method may be implemented using other systems and other system configurations then the system and configuration illustrated in FIG. 1. The macro base station operates in the same 3.5 GHz band as the CBRS network.

The method 1000 shown in FIG. 10 will now be discussed in detail. The method starts in start step 1002 shown on FIG. 10A with the devices in system 100 being initialized and becoming operational. The CBSDs (CBSD 1 106 and CBSD X 108) and macro base station (102) of the system 100 register with the SAS 1 116. Registration including providing contact information to the SAS 1 116, e.g., Internet Protocol address information. The CBSDs also registers with the CBSD Operator Network Core registrar 114 and the macro base station registers with the MVNO network core registrar 120. Operation proceeds from step 1002 to step 1004.

In step 1004, a first user equipment device (UE), e.g., UE 1 110 illustrated in FIG. 1, is operated to report the physical cell identities (PCIs) of macro base stations from which the first UE is receiving signals, said PCIs including a first macro base station, e.g., macro base station 102 which may be, and in some embodiments is an LTE eNobeB base station. In some embodiments, step 1006 includes sub-step 1008. In sub-step 1008, the first UE is operated to report the physical cell identities (PCIs) of the macro base stations from which the first UE receives signals to CBSDs requesting said PCIs from said first UE, e.g., UE 1 110. In the example of system 100, the UE 1 110 reports, i.e. transmits, the PCI of the macro base station 102 to CBSD 1 106 and/or CBSD X 108 as the UE 1 110 is in the coverage area of the macro base station 102 and receives the PCI of the macro base station in signals it receives from the macro base station. UE 1 110 is also in the coverage area of both CBSD 1 106 and CBSD X 108. In some embodiments, the UE 1 110 reports the PCI of the macro base station 102 in response to a request from CBSD 1 106 and/or CBSD X 108 to report all PCIs of macro base station from which UE 1 102 is receiving signals. Operation proceeds from step 1006 to step 1010.

In step 1010, a spectrum access system (SAS) is operated to determine from PCI information reported by the first UE, CBSDs in the coverage area of the first macro base station. In some embodiments, step 1010 includes sub-step 1012. In sub-step 1012, the SAS is operated to receive the PCI information reported by the first UE from a CBSD that received the PCI information from the first UE. The PCI information is or includes the PCIs of macro base stations from which the UE 1 110 is receiving signals. In system 100 the SAS 1 116 receives the PCI information from UE 1 110 from CBSD 1 106 and/or CBSD X 108. The PCI information received includes the PCI for the macro base station 102. Operation proceeds from step 1010 to step 1014.

In step 1014, the SAS is operated to instruct CBSDs in the coverage area of the first macro base station to establish X2 connections with the first macro base station. The instruction transmitted from the SAS to the CBSDs may, and in some embodiments does, include contact information for the first macro base station, e.g., the IP address of the first macro base station. In some embodiments, the macro base station learns the IP address of the first macro base station when it registers with the SAS at which time it may provide its IP address and physical cell identity. Operation proceeds from step 1014 to step 1016.

In step 1016, the CBSDs in the coverage area of the first macro base station (CBSD 1 106 and CBSD X 108) are operated to establish X2 connections with the first macro base station, e.g., macro base station 102, in response to instructions from the SAS, e.g., SAS 1 116. Operation proceeds from step 1016 to step 1018.

In step 1018, the first macro base station is operated to measure the latency, e.g., average latency, of the X2 connections/links to the CBSDs with which X2 connections are established (e.g, CBSD 1 106 and CBSD X 108). The latency of the X2 connections may be, and in some embodiments are, determined using ping operations. The X2 connection/link latencies are typically ranked from highest to lowest link X2 connection/link latency with the results stored in a record in memory wherein the X2 connection/link latency is stored in memory in the first macro base station along with the PCI of the CBSD to which the X2 connection/link corresponds. Operation proceeds from step 1018 via connection node A 1019 to step 1020 illustrated on FIG. 10B.

In step 1020, the first macro base station is operated to determine the total number of antennas to be used to communicate data to the first UE. In some embodiments, step 1020 includes one or more of sub-steps 1022, 1024, 1026, 1028, 1030.

In sub-step 1022, the first macro base station is operated to receive a report of the PCIs of the CBSDs with signals being received by the first UE, e.g., CBSD 1's PCI and CBSD X's PCI.

In sub-step 1024, the first macro base station is operated to determine a plurality of CBSDs with X2 connections to the first macro base station and whose CBSD PCI information was received from the first UE. In this example, the plurality of CBSDs with X2 connections to the first macro base station 102 and who have established connections with the macro base station 102 are CBSD 1 106 and CBSD 2 108.

In sub-step 1026, the first macro base station is operated to determine the number of antennas each of the CBSDs with which an X2 connection has been established and whose CBSD PCI information was received from the first UE by the first macro base station has available for communication with said first UE. In the example of system 100, the CBSD 1 106 has 2 antennas and CBSD X 108 has 2 antennas. In some embodiments, the number of antennas available for each CBSD to use for communicating with the first UE is determined via information transmitted to the first macro base station from each of the CBSDs. That is each CBSD reports the number of available antennas it has for communication with first UE or just the number of antennas it has for communicating with any UE to the first macro base station. In some embodiments, the first macro base station determines the number of available antennas each CBSD has from messages received from the SAS, e.g., SAS 1 116. Each CBSD having reported the number of antennas it has to the SAS for example when it reported the PCIs of the macro base stations the UEs in its coverage area were receiving signals from.

In sub-step 1028, the first macro base station is operated to determine the number of antennas the first macro base station has available for communicating with the first UE.

In sub-step 1030, the first macro base station is operated to receive, e.g., from the SAS which receives CBSD antenna information from the CBSDs) at the first macro base station information indicating a number of antennas available for use in transmitting to the first UE at each CBSD with which an X2 connection is established.

Once the first macro base station has determined the number of antennas each CBSD has available for communicating with the first UE and the number of antennas it has available for communicating with the first UE, it can sum number of antennas to determine the total number of antennas available for communicating with the first UE. In the present example, the CBSD 1 106 has 2 antennas (antenna 130 and antenna 132), CBSD X 108 has 2 antennas (antenna 136 and antenna 138) and the macro base station 102 has 4 antennas (antennas 122, 124, 126 and 128) which can be used to communicate with UE 1 110. The macro base station 102 therefore determines that there are 8 antennas available for communicating with UE 1 110. While UE 1 110 is shown as having a single antenna 441, UE 1 441 may have one or more antennas, e.g., 8 antennas, or an antenna array in which the antenna has a plurality of elements allowing it to receive signals from a plurality of different antennas. Operation proceeds from step 1020 to step 1032.

In step 1032, the first macro base station is operated to determine a size of a set of data, to be requested from a macro network core, e.g., MVNO macro network core 104, for transmission to the first UE based on the number of antennas available for use in transmitting data to the first UE, said number of antennas available for use in transmitting data to the first UE including at least some CBSD antennas at CBSDs having X2 connections with the first macro base station. In this example, the Network Services with data for UE 118 in MVNO Network Core 104 represents the apparatus/service from which the data will be requested by the first macro base station 102. In this example, the size of the set of data is determined based on 8 antennas determined to be available for communicating with the first UE, e.g., UE 1 110. Operation proceeds from step 1032 to step 1034.

In step 1034 the first macro base station is operated to request a first set of data for transmission to the first UE, e.g., from Network Services 118 of MVNO network core 104. The request for the first set of data including information on the determined size of the set of data. Operation proceeds from step 1034 to step 1036.

In step 1036, the first macro base station is operated to receive the first set of data to be transmitted to the first user equipment device (UE) in response to the request for the first set of data from the macro network core, e.g., request to network services 118 of MVNO network core 104. Operation proceeds from step 1036 via connection node B 1038 to step 1040 illustrated on FIG. 10C.

In step 1040, the first macro base station is operated to allocate, e.g., divide, the first set of data into a plurality of N data blocks, the N number of data blocks being equal to the number of antennas to be used to communicate to the first UE. In this example, N=8 as there are 8 antennas. Operation proceeds from step 1040 to step 1042.

In step 1042, the first macro base station is operated to encode each of the N data blocks using an orthogonal code wherein each block is coded so that it is independent of the other blocks for purposes of transmission from different CBSDs. Operation proceeds from step 1042 to step 1044.

In step 1044, the first macro base station is operated to communicate to each of a plurality of different Citizen Broadband Radio Service devices (CBSDs) one or more different ones of said plurality of N data blocks. The plurality of different CBSDs being CBSDs with which X2 connections are established with the first macro base station and have PCIs reported to the first macro base by the first UE indicating that the first UE is receiving signals from these CBSDs. In this example, the plurality of different CBSDs includes CBSD 1 106 and CBSD X 108. In some embodiments, step 1044 includes one or more sub-steps 1046, 1048, 1050, and 1052.

In sub-step 1046, the first macro base station is operated to communicate the one or more of said plurality of N data blocks to the plurality of different CBSDs over X2 interface connections/links between the first macro base station and the plurality of different CBSDs.

In sub-step 1048, the first macro base station is operated to communicate data blocks to CBSDs in an order based on the latency of the X2 connection between the first macro base station and the CBSD, e.g., data blocks are sent to CBSDs in the order of highest to lowest X2 connection latency.

In sub-step 1050, the first macro base station is operated to communicate blocks of data to individual CBSDs in said plurality of different CBSDs in an order based on the latency or average latency of an individual X2 connection/link between the first macro base station and the individual CBSD to which the individual X2 connection corresponds.

In sub-step 1052, the first macro base station is operated to communicate blocks of data to CBSDs with X2 connections/links having higher connection/link latency prior to CBSDs having X2 connections/links having a lower link latency.

Operation proceeds from step 1044 to step 1054. In step 1054, the plurality of different CBSDs are operated to transmit the one or more data blocks which they receive from the first macro base station to the first UE. Operation proceeds from step 1054 to step 1056.

In step 1056, the process is repeated for additional sets of data communications to the same or other UEs attached to the first macro base station.

Figures 11, 11A, 11B:
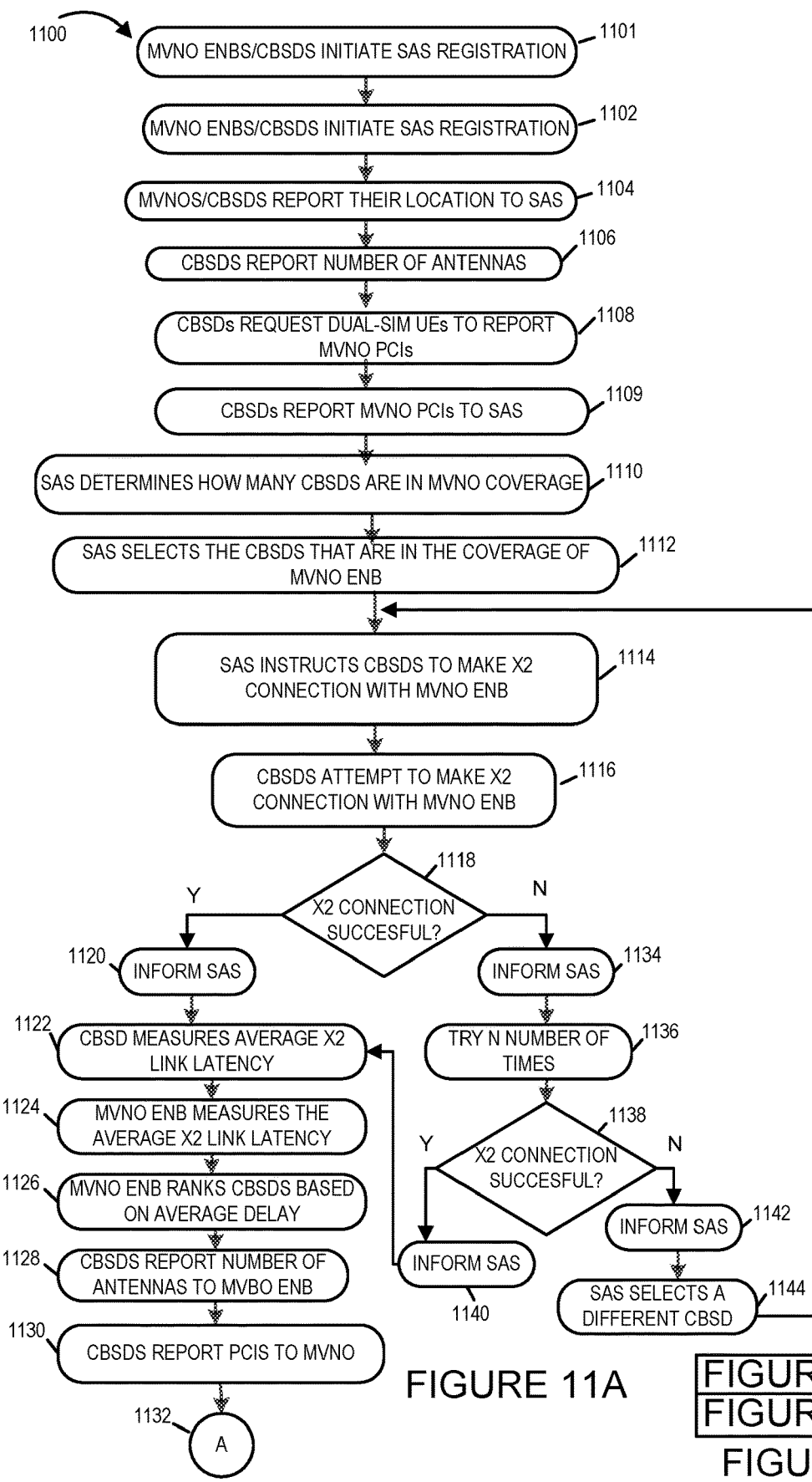
FIG. 11 illustrates the combination of FIGS. 11A and 11B.
FIG. 11A illustrates the steps of the first part of an exemplary communications method in accordance with one embodiment of the present invention.
FIG. 11B illustrates the steps of the second part of an exemplary communications method in accordance with one embodiment of the present invention.
Figure 11B:
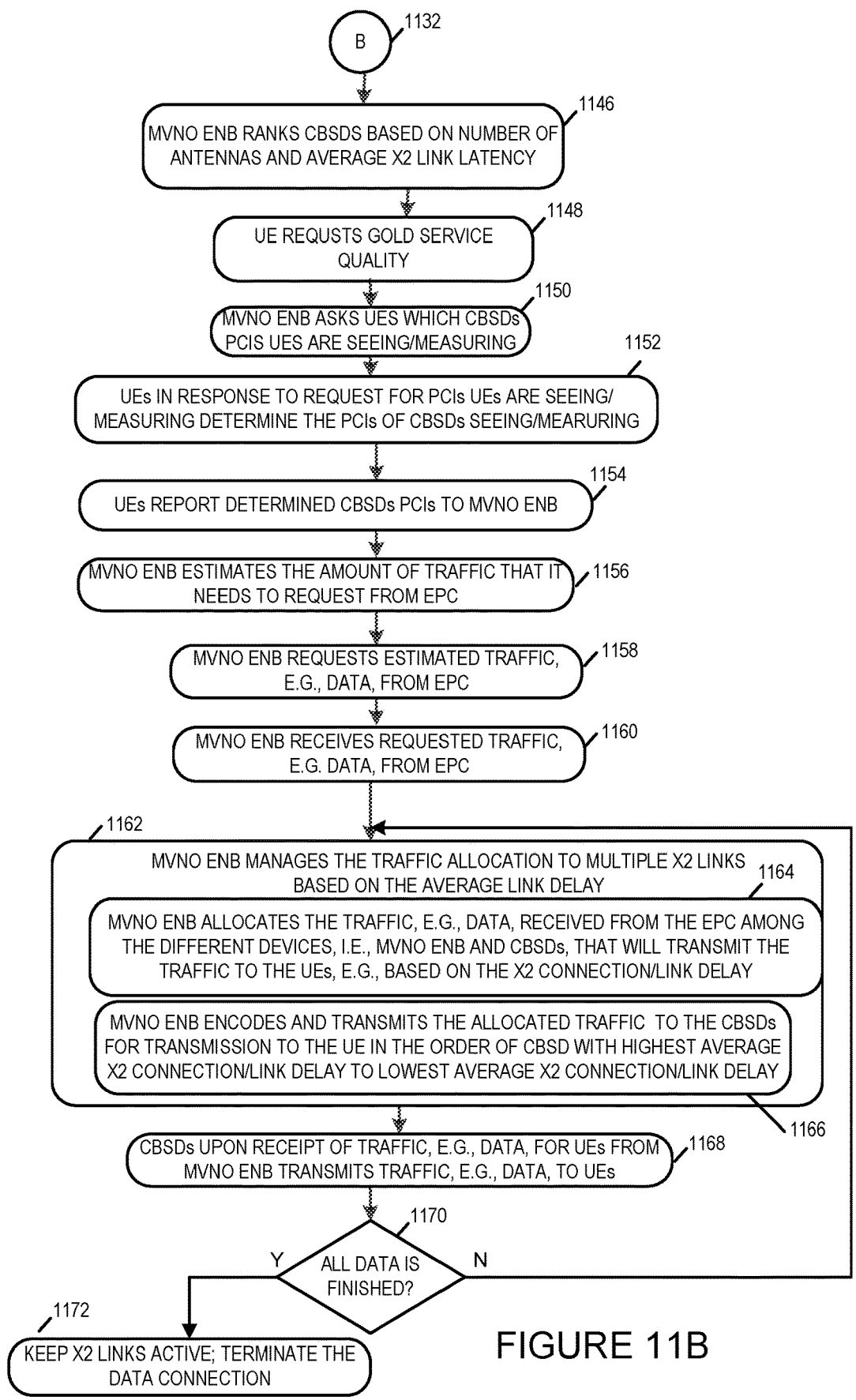

FIG. 11, which comprises the combination of FIGS. 11A and 11B illustrates an exemplary communications method 1100 for providing data to a user equipment device through the use of multiple antennas located at a macro base station and one or more CBSDs devices. FIG. 11A illustrates the steps of the first part of the exemplary method 1100 in accordance with one embodiment of the present invention. FIG. 11B illustrates the steps of the second part of the exemplary method 1100 in accordance with one embodiment of the present invention.

For explanatory purposes the exemplary method 1100 will be explained in connection with the exemplary communications system 100 illustrated in FIG. 1 although it should be understand that the method may be implemented using other systems and other system configurations then the system and configuration illustrated in FIG. 1. The macro base station operates in the same 3.5 GHz band as the CBRS network.

The method 1100 shown in FIG. 11 will now be discussed in detail. The method starts in start step 1101 shown on FIG. 11A with the devices in system 100 being initialized and becoming operational. Operation proceeds from step 1101 to step 1102.

In step 1102 the macro base station 1102 which is an MVNO eNodeB in this example and CBSD 1 106 and CBSD X 108 initiate registration with the SAS 1 116. Operation proceeds from step 1102 to step 1104.

In step 1104, the macro base station 102 and CBSD 1 106 and CBSD X 108 as part of their registration with SAS 1 116 report their respective location to SAS 1 116. The macro base station as part of the registration process with the SAS 1 116 reports not only its location but also its Internet Protocol (IP) address and the Physical Cell Identities (PCIs) of all of its sectors for example if it is a multi-sector site it will have more than one PCI associated with the macro base station. Operation proceeds from step 1104 to step 1106.

In step 1106 also as part of the registration process CBSD 1 106 and CBSD X 108 report the number of antennas they hold to the SAS 1 116. CBSD 1 106 reports that it holds 2 antennas and CBSD X 108 reports that it holds 2 antennas. upon completion of the registration by the CBSD 1 106 and CBSD X 108 with the SAS 1 116, the SAS 1 116 will be assigned spectrum by the SAS 1 116 for wireless communications. Operation proceeds from step 1106 to step 1108.

In step 1108, once the CSBD 1 106 and CBSD X 108 have received their spectrum assignments from the SAS 1 116, the CBSDs will start serving the user devices of its subscribers including UE 1 110. CBSD 1 106 and CBSD X 108 will request the dual SIM user equipment devices to report the Physical Cell Identities (PCIs) of macro base stations e.g., MVNO eNodeBs, from which the user equipment devices are receiving signals. Operation proceeds from step 1108 to step 1109.

In step 1109, each CBSD, i.e., CBSD 1 106 and CBSD X 108, report the PCIs of the macro base stations reported from the user equipment devices to the SAS 1 116. Operation proceeds from step 1109 to step 1110.

In step 1110, SAS 1 116 determines how many and which CBSDs are in the macro base station, MVNO eNodeB, coverage age. In some embodiments the SAS 1 116 makes this determination based on the CBSDs reported locations against or with the macro base stations reported location. In some embodiments, the SAS 1 116 also makes the determination based on macro base station, e.g., MVNO eNodeB, PCIs in order to determine how many of the CBSDs are in the cell coverage area of the macro base station. For example, SAS 1 116 can determine the CBSDs which are located in a 500 meter radius of the macro base station. Operation from step 1110 to step 1112.

In step 1112, the SAS 1 116 selects the CBSDs that are in the coverage area of the macro base station, e.g., those CBSDs that were identified as being within a predetermined geographical range of the macro base station, e.g., within a 500 meter radius, and/or CBSDs which reported PCI information corresponding to the macro base station. In this example, CBSD 1 106 and CBSD X 108 are both selected as both are within the coverage area of the macro base station. Operation proceeds from step 1112 to step 1114.

In step 1114, SAS 1 116 instructs each of the selected CBSDs (CBSD 1 106 and CBSD X 108) to make an X2 connection with macro base station 102 by sending the IP address of the macro base station to the selected CBSDs. Operation proceeds from step 1114 to step 1116.

In step 1116, each of the selected CBSDs (i.e., in this example CBSD 1 106 and CBSD X 108) in response to receiving the instruction to make an X2 connection with the macro base station, MVNO eNodeB, 102 attempts to make an X2 connection with macro base station 102. Operation proceeds from step 1116 to decision step 1118.

In decision step 1118, each CBSD that attempted to make an X2 connection with the macro base station 102 as instructed by the SAS 1 116 makes a determination as to whether the X2 connection has been successfully established. When the determination is that the X2 connection between the CBSD and the macro base station has been successfully established operation proceeds from step 1118 to step 1120. When the CBSD determines that the X2 connection has not been successfully established operation proceeds from step 1118 to step 1134. In step 1134, each CBSD that was not able to successful establish an X2 connection with the macro base station 102 transmits a message to SAS 1 116 information the SAS 1 116 of the status of the connection, i.e. that the X2 connection attempt has not been successful. Operation proceeds from step 1134 to step 1136. In step 1136, each selected CBSD that has not been able to successful establish an X2 connection with the maco base station 102 repeatedly tries to establish an X2 connection with the macro base station 102 until the X2 connection is successful or a maximum number of attempts N is reached. Operation proceeds from step 1136 to decision step 1138.

In decision step 1138, each of the selected CBSDs which were not able to successfully establish an X2 connection with the macro base station 102 in step 1116 determine whether they were able to successful establish an X2 connection in step 1136. If the selected CBSD was not able to establish a successfully X2 connection in step 1136 operation proceeds to step 1144. If the selected CBSD was able to establish a successful X2 connection in step 1136 operation proceeds to step 1140. The decision step 1138 may be performed after each attempt in step 1136 until a successful X2 connection is made by the CBSD or the N number of attempts has been reached.

In step 1142, each selected CBSD which was not able to make a successful X2 connection with the macro base station 102 after N number attempts transmits a message to the SAS 1 116 informing the SAS 1 116 of its failure to make an X2 connection after N attempts. Operation proceeds from step 1142 to step 1144.

In step 1144, for each selected CBSD that reported that it was unsuccessfully in establishing an X2 connection with the macro base station 102 after N attempts, SAS 1 1116 selects a different CBSD within the coverage range of the macro base station 102 which had not been previously selected in place of the CBSD that had been selected but which was not successful in establishing an X2 connection with the macro base station 102. This assumes that there are additional CBSDs in the coverage range that were not previously selected by the SAS 1 116. Operation proceeds from step 1144 to step 1114 and the process continues with respect to the CBSDs selected by SAS 1 116 in step 1144.

In step 1140, each of the selected CBSDs which were able to successfully form an X2 connection with the macro base station 102 in step 1136 transmits a message to the SAS 1 116 informing the SAS 1 116 that it has successfully established an X2 connection with the macro base station 102. Operation proceeds from step 1140 to step 1122.

Returning to step 1120, each of the selected CBSDs which were able to successfully form an X2 connection with the macro base station 102 in step 1116 as determined in step 1118 transmits a message to the SAS 1 116 informing the SAS 1 116 that it has successfully established an X2 connection with the macro base station 102. In the present example, both the CBSD 1 106 and CBSD 2 108 successfully establish X2 connections with the macro base station 102. Operation proceeds from step 1120 to step 1122.

In step 1122, each selected CBSD measures the average X2 connection link latency between itself and the macro base station 102. This may be, and in some embodiments is accomplished by using a simply traffic type test such as a ping. Each selected CBSD may, and in most embodiments do, store the result of the measurements in their memory. In this example, CBSD 1 106 and CBSX 2 108 each measure the average X2 connection latency via pinging operations to the macro base station 102. Operation proceeds from step 1122 to step 1124.

In step 1124 the macro base station 102 measures the average latency of each X2 connection/link established between itself and each of the selected CBSDs with which a successfully X2 connection has been established between the selected CBSD and the macro base station 102. The macro base station 102 may determine the average X2 connection/link latencies with each of the selected CBSDs to which an X2 connection has been established through the use of ping operations. Operation proceeds from step 1124 to step 1126.

In step 1126, the macro base station 102 ranks the selected CBSDs with which an X2 connection has been successfully established based on the average delay measured of the X2 connection/link between the macro base station and the selected CBSD. Operation proceeds from step 1126 to step 1128.

In step 1128, each of the selected CBSDs (CBSD 1 106 and CBSD X 108 in this example) report the number of antennas the CBSD has to the macro base station 102. Operation proceeds from step 1128 to step 1130.

In step 1130, each of the selected CBSDs which has successfully established a X2 connection with the macro base station 102 reports the PCIs it has received from UEs it is serving to the macro base station 102. Operation proceeds from step 1130 via connection node A 1132 to step 1146 shown on FIG. 11B.

Figure 2:
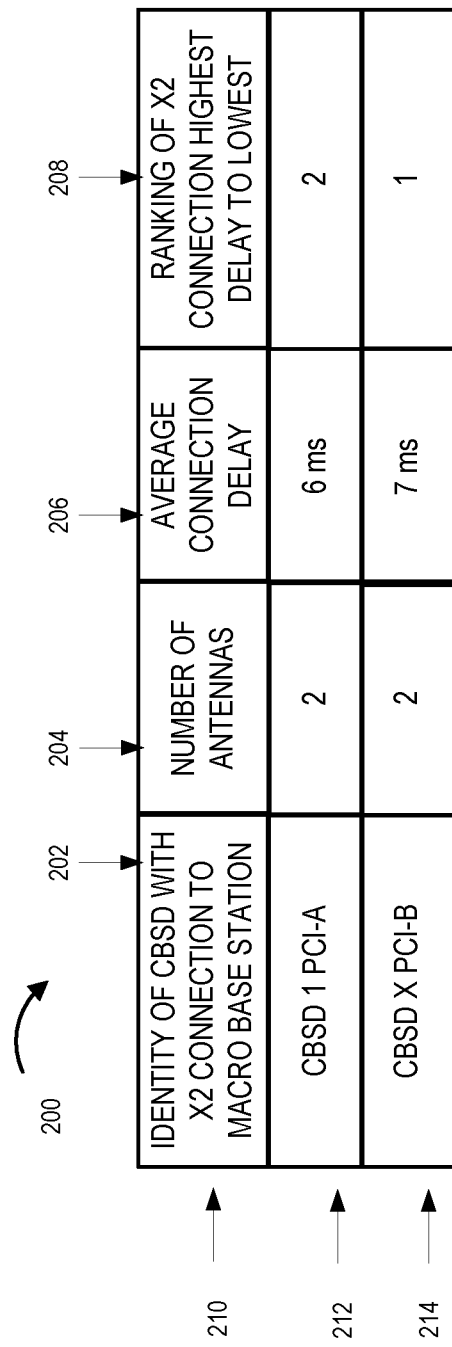
FIG. 2 illustrates a macro base station record containing information about CBSDs with X2 connections to the macro base station as while as information about the X2 connections.

In step 1146, the macro base station 102 further ranks the selected CBSDs which have established an X2 connection with the macro base station based on number of antennas. The macro base station 102 ranking in step 1146 will therefore be based on the number of antennas the CBSD has and the average X2 connection/link latency between the CBSD and the macro base station 102. CBSDs will be ranked so that CBSDs with the higher number of antennas and lower average X2 connection/link latency will be ranked as the highest in the list. For example, a ranking list may be generated in which the ranking from highest to lowest CBSD is based first on the greater the number of antennas a CBSD the higher the ranking and then ranking the CBSDs with the same number of antennas based on the X2 connection delay with lower the X2 connection delay the higher the ranking. For example, CBSD 1 106 has two antennas and CBSD X 108 has two antennas and the CBSD 1 106 X2 connection has an average X2 connection delay of 6 milliseconds and the CBSD X 108 X2 connection has an average X2 connection delay of 7 milliseconds, the macro base station 102 ranks CBSD 1 106 first (highest ranking) and CBSD X 108 second (lowest ranking) as they both have the same number of antennas and CBSD X 108 has a higher average X2 connection delay then CBSD 1 106. FIG. 2 illustrates a table which may be, and in some embodiments is stored in a record in the memory of the macro base station 102 that ranks the X2 connections between the macro base station 102 and CBSD 1 106 and CBSD X 108 based on the average X2 connection delay. Operation proceeds from step 1146 to step 1148.

In step 1148, the macro base station 102 receives a request transmitted from UE 1 110 requesting "Gold Service" quality. The request may be, and in some embodiments is, a Radio Resource Control (RRC) Connection Reconfiguration Accept message sent to the macro base station in response to an RRC Connection Reconfiguration message or included in a RRC Connection Reconfiguration Accept message. The Gold Service quality being a quality of service in which data is provided to the UE 1 110 at a higher rate than a normal or lower quality of service rate for example using multiple antennas from both the macro base station 102 and the CBSDs having a coverage range including the UE 110. In this example, UE 1 110 requests "Gold Service" quality. Operation proceeds from step 1148 to 1150.

In step 1150, the macro base station 102 transmits a request to the UEs which requested Gold Service to report the CBSDs PCIs the UEs are seeing/measuring a received signal from. In this example, macro base station 102 transmits a request to the UE 1 110 to report the CBSDs PCIs the UE from which UE 1 is receiving signals. Operation proceeds from step 1150 to step 1152.

In step 1152, each UE that requested "Gold Service" quality and has been requested to provide the CBSDs PCIs it is seeing/measuring received signals from determines the CBSDs PCIs that it is seeing/measuring received signals from. In this example UE 1 110 determines that is seeing/measuring signals received from CBSD 1 106 and CBSD X 108 and determines the PCI for CBSD 1 106 and determines the PCI for CBSD X 108. In this example, the PCI for CBSD 1 106 will be referred to as PCI-A and the PCI for CBSD X 108 will be referred to as PCI-B. Operation proceeds from step 1152 to step 1154.

In step 1154, each UE that received a request from the macro base station 102 to report the PCIs of the CBSD whose signals it was receiving/seeing/measuring transmits/sends the PCIs of the CBSDs it determined to the macro base stations. Operation proceeds from step 1154 to step 1156.

In step 1156, the macro base station 102 determines and/or estimates the amount of traffic that it will request from the MVNO core network for transmission to UE 1 110 in connection with a UE 1 110 requested service, e.g., audio and/or video data to be provided in response to a video on demand request. The determination and/or estimation is based on the total number of antennas that the macro base station 102 has available to transmit data to the UE 1 110. For example, the number of antennas of each of the CBSDs with a PCI reported by the UE 1 110 combined with the number of antennas the macro base station 102 has. In this example, the macro base station 102 has 4 antennas, CBSD 1 106 has 2 antennas and CBSD X 108 has 2 antennas so the total number of antennas that the macro base station 102 has available for use in transmission of data to the UE 1 110 is 8. The macro base station 102 that should request data for 8 antennas or twice as much data as it would request if it was not using CBSD 1 106 and CBSD X 108 antennas to transmit data to the UE 1 110 in addition to its four antennas. Operation proceeds from step 1156 to step 1158.

In step 1158, the macro base station 102 requests data from the MVNO network core 104 to be transmitted to UE 1 110 for 8 antennas or twice more than the amount it would request if it was not using the CBSD 1 106 and CBSD X 108 to also transmit data to the UE 1 110. In this example, the MVNO network core is an Evolved Packet Core (EPC). Operation proceeds from step 1158 to step 1160.

In step 1160, the macro base 102 receives the requested data from the MVNO network core 104, e.g., from network services with data for UE 118. Operation proceeds from step 1160 to step 1162.

In step 1162, the macro base station 102 manages the traffic allocation to multiple X2 links based on the average X2 connection link delay. In some embodiments, step 1162 includes one or more of sub-steps 1164 and 1166. In sub-step 1164, the macro base station 102 allocates the total data received from the MVNO network core into segments for each device which will be transmitted traffic, e.g., data, to the UE. In this example, macro base station 102 allocates the data received from the MVNO network into three segments as there are three devices, the MVNO macro base station, CBSD 1 106 and CBSD X 108 which will transmit the data to UE 1 110. In this example, the received data is divided into three segments or blocks. The allocation is based on the number of antennas each device that will be used to transmit the data to UE 1 110. In sub-step 1166, the macro base station encodes each of the data segments or blocks using an orthogonal code. Each data segment or block is coded so that it is independent of the other data segments or blocks for purposes of transmission from different CBSDs before it is communicated over the X2 connection to the CBSDs. In some embodiments, the data segment or block format includes "UE Identifier, e.g., UE International Mobile Subscriber Identity (IMSI)", "Data Segment/Block No", "Data Segment/Block Size", "Original Data/Retransmission Data", and the data to be transmitted. In sub-step 1166, the macro base station 102 transmits the data segments or blocks to the CBSDs in the order of highest X2 connection/link delay to lowest X2 connection/link delay. In this example, The X2 connection/link average delay between the macro base station 102 and the CBSD X 108 is 7 milliseconds (ms) and the X2 connection/link average delay between the macro base station 102 and the CBSD 1 106 is 6 ms. As a result, in this example the macro base station 102 first transmits the data segment/block allocated for CBSD X 108 to CBSD X 108 and then transmits the data segment/block allocated for CBSD 1 106 to CBSD 1 106. Using this approach of transmitting the data segments/blocks in order of highest X2 connection/link delays to lowest X2 connection/link delays results in the data segments/blocks reaching the UE 1 110 at a desired time, e.g., at approximately the same time or within a 2 ms window. It should be noted that in some embodiments if the X2 connection/link average delays/latency are not within an allowable range to meet the data transmission requirements the link is not selected for use in transmitting data from the macro base station 102 to the CBSDs. Operation proceeds from step 1162 to step 1168.

In step 1168, the CBSDs upon receipt of the data segments/blocks communicated from the macro base station 102 transmit the data segments/blocks to the UEs. In this example, upon the receipt of the data segment/block for the UE 1 110 from the macro base station 102 by CBSD 1 106, CBSD 1 106 transmits the data to the UE 1 110 using its two antennas. Similarly, upon the CBSD X 108 receiving the data segment/block for UE 1 110 from the macro base station 102, the CBSD X 108 transmits the data to the UE 1 110 using it two antennas. The macro base station 102 transmits the data segment/block it allocated to itself and transmits the data to UE 1 110 using it four antennas after it transmits the data segments/block to the CBSD 1 106 and CBSD X 108. Operation proceeds from step 1168 to decision step 1170.

In decision step 1170, the macro base station 102 determines whether all data has been transmitted to UE 1 110. Upon a determination that all data has finished being communicated to UE 1 110, operation proceeds from step 1170 to step 1172. When a determination is made that all data has not finished being communicated to UE 1 110, operation proceeds to step 1162 where the method proceeds as previously described with the macro base station 102 continues to manage the allocation and transmission of traffic, e.g., data, to the UEs which in this example is UE 1 110.

In step 1172, once all of the traffic, e.g., data, has been transmitted to the UEs which in this example is UE 1 110, the X2 connection/links with the CBSDs remain active while the data session is terminated, e.g., by the macro base station 102. In this way the X2 connections/link established between the macro base station 102 and the CBSDs (CBSD 1 106 and CBSD X 108) remain available for use in transmitting additional data to the UE 1 110 at a later time or to other UEs with dual SIM cards in the coverage area of the macro base station 102 and CBSD 1 106 and CBSD X 108.

System 1200 of FIG. 12 illustrates another exemplary embodiment of the present invention. System 1200 includes a macro base station 1202 e.g., MVNO LTE eNodeB, a mobile operator core network also referred to as a macro core network or macro network core 1204, a plurality of Citizens Broadband Radio Service Devices (CBSDs), CBSD A 1206, CBSD B 1208, and CBSD C 1210, a CBSD core network 1212, a Spectrum Access System 1216, a user equipment device (UE) 1214, and communications links coupling/connecting the various system elements together. Communications link 1236 couples the macro base station 1202 to the mobile operator core network 1204. Communications link 1238 the mobile operator network 1204 to the CBSD core network 1212. Communications link 1240 couples the CBSD core network 1212 to the Spectrum Access System 1216. The CBSD core network 1212 is coupled to the CBSD A 1206, CBSD B 1208 and CBSD C 1210 via S1/X2 interface connections 1226, 1228, 1230 respectively. The macro base station 1202 is coupled to CBSD A 1206, CBSD B 1208, and CBSD C 1210 via X2 interface connections 1220, 1222, and 1224 respectively. The UE 1214 is a dual SIM device that includes a first subscriber identity module (SIM) for communicating with the macro base station 1202 and a second subscriber identity module (SIM) for communicating with the CBSDs of the CBSD network which include CBSD A 1206, CBSD B 1208, and CBSD C 1210.

The UE 1214 is within the mobile cover range of the macro base station 1202 and CBSD A 1206, CBSD B 1208 and CBSD C 1210. The macro base station 1202 and the CBSDs A 1206, B 1208, and C 1210 are operating in the same 3.5 GHz frequency spectrum.

Dashed line 1232 illustrates that UE 1214 registers with the mobile operator core network 1204. The UE 1214 registers with the mobile operator core network 1204 via the macro base station 1202. Dashed line 1234 illustrates that UE 1214 in addition to registering with mobile operator core network 1204 also registers with the CBSD core network 1212. The UE 1214 registers with the CBSD core network 1212 via one of the plurality of CBSDs which include CBSD A 1206, CBSD B 1208, and CBSD C 1210.

The macro base station 1202 registers with the SAS 1216. CBSD A 1206, CBSD B 1208, and CBSD 1210 also register with the SAS 1216.

FIG. 13 illustrates the transmission of data to mobile UE 1214 from macro base station 1202 via CBSD A 1206, CBSD B 1208, and CBSD 1210. The macro base station 1202 determines that there are 16 antennas available for transmitting data to the UE 1214. Four antennas are available to transmit data to the UE 1214 from the macro base station 1202. Four antennas are available to transmit data to the UE 1214 from the CBSD A 1206. Four antennas are available to transmit data to the UE 1214 from the CBSD B 1208. Four antennas are available to transmit data to the UE 1214 from the CBSD A 1210. The macro base station 1202 requests and receives data from the mobile operator network 1204 illustrated in FIG. 12. The size of the amount of the data requested being based on the total number of antennas available for transmitting the data to the UE 1214 which in this case is 16. Upon receiving the requested data, the macro base station encodes the data in N data segments or blocks, N being the number of antennas 16. Each data block or segment is encoded by the macro base station 1202 so that each of the data blocks or segments is independent of the other data blocks or segments for purposes of transmission from different antennas.

The order of the blocks of data being transmitted to the CBSDs is based on the average latency of the X2 connection between the macro base station 1202 and the individual CBSDs to which data is being transmitted. Data is transmitted to the CBSDs from highest X2 connection/link latency to lowest X2 connection/link latency. The macro base station 1202 determines the X2 connection/link latency using ping operations after the X2 connection between the macro base station 1202 and the CBSD has been established.

Figure 14:
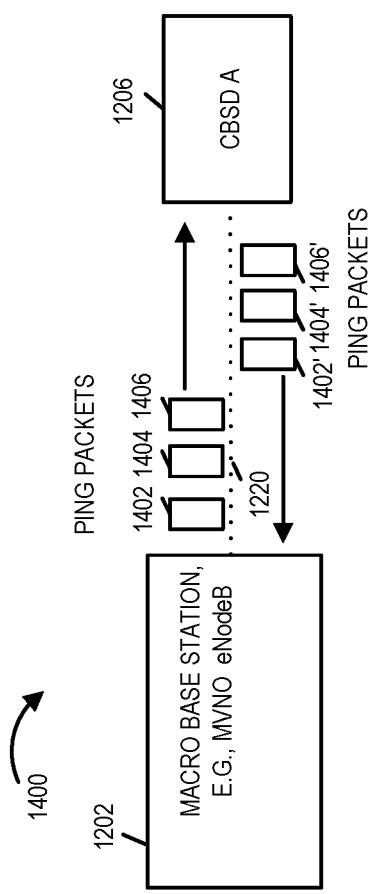
FIG. 14 illustrates the use of ping operations to determine, e.g., measure, an X2 connections average connection/link latency.

FIG. 14 illustrates the determination of the X2 connection/link 1220 latency using ping operations. The macro base station 1202 send ping packets 1402, 1404, and 1406 over the X2 connection 1220 to the CBSD A 1206. The CBSD A 1206 echoes back ping packets 1402',1404', and 1406' to the macro base station 1202. The macro base station 1202 determines the round trip time of the ping packets and measures the average delay of the X2 connection.

In this example, the X2 connection 1220 has an average delay of 1 millisecond (ms), the X2 connection 1222 has an average delay of 2.1 ms, and the X2 connection has an average delay of 2 ms.

In this example, the order of transmission is that data is transmitted first to CBSD B 1208, then to CBSD C 1210 and finally to CBSD A 1206. As such, the first 4 encoded data blocks are allocated to the CBSD B which has 4 antennas and are transmitted to the CBSD B 1208 via the X2 connection 1222 as represented by line 1304. The second 4 encoded data blocks are allocated to the CBSD C 1210 and are transmitted to the CBSD C 1210 via the X2 connection 1224 as represented by the line 1308. The third 4 encoded data blocks are allocated to the CBSD A 1206 and are transmitted to the CBSD A 1206 via the X2 connection 1220 as represented by the line 1302.

Each of the CBSDs A 1206, B 1208 and C 1210 transmit the encoded data blocks via there antennas to the UE 1214 upon receiving the data blocks. The macro base station 1202 transmits the fourth 4 encoded data blocks to the UE 1214 using its 4 antennas. The macro base station 1202 may, and in some embodiments does, transmit its 4 data blocks to the UE 1214 upon the completion of the transmission of the other data blocks to the CBSDs. Line 1310 represents the transmission of the last 4 encoded data blocks (data blocks 13, 14, 15 and 16) being transmitted from the 4 antennas of the macro base station 1202 to the UE 1214. Line 1312 represents the transmission of the data blocks 9, 10, 11, and 12 being transmitted from the 4 antennas of the CBSD A 1206 to the UE 1214. Line 1314 represents the transmission of the data blocks 1, 2, 3, 4 being transmitted from the 4 antennas of the CBSD B 1208 to the UE 1214. Line 1316 represents the transmission of the data blocks 5, 6, 7, and 8 being transmitted from the 4 antennas of the CBSD C 1210 to the UE 1214.

The ordering of the transmission of the data blocks to the CBSDs by lowest to highest X2 connection/link latency allows for the data to be received at the UE 1214 at about or around the same time or within an acceptable time window.

The methods 1000 illustrated in FIG. 10 and 1100 illustrated in FIG. 11 may be, and in some embodiments are, implemented on the system 1200 illustrated in FIG. 12.

LIST OF EXEMPLARY NUMBERED METHOD EMBODIMENTS

Method Embodiment 1

A communications method, the method comprising: operating a first macro base station to receive a first set of data to be transmitted to a first user equipment device (UE); operating the first macro base station to divide said first set of data into a plurality of N data blocks; and communicating to each of a plurality of different Citizens Broadband Radio Service Devices (CBSDs) one or more different ones of said plurality of N data blocks (note the first macro base station can keep and send a block so the number of blocks to CBSDs can be less than N with the first macro base station transmitting at least one block, each CBSD can receive more than one data block with N corresponding to the N number of antennas which will be used to separately transmit data so if a CBSD has two antennas it might receive two blocks for example); and operating the plurality of CBSDs to transmit the one or more data blocks which they receive from the first macro base station to the first UE.

Method Embodiment 2

The method embodiment of method embodiment 1, wherein said CBSDs and said first macro base station use the same frequency spectrum, said first macro base station being part of a macro network, e.g., (LTE network) and said CBSDs being part of a Citizens Broadcast Radio Service (CBRS) network.

Method Embodiment 3

The method of method embodiment 1 wherein said first UE is a dual Subscriber Identity Module (SIM) card UE capable of communicating with the first macro network using a mobile identity corresponding to a first Subscriber Identity Module (SIM) card and communicating with a CBRS network including the CBSD using a mobile identity corresponding to the second Subscriber Identity Module (SIM) card.

Method Embodiment 4

The method of method embodiment 1, further comprising: operating the first macro base station to encode each of the N data blocks using an orthogonal code (each block is coded so that it is independent of the other blocks for purposes of transmission from different CBSDs before it is communicated over the X2 connection to the CBSDs) prior to performing said step of communicating to each of a plurality of different CBSDs one or more different ones of said plurality of N data blocks.

Method Embodiment 5

The method of method embodiment 1, further comprising: operating the first UE to report Physical Cell Identities (PCIs) of macro base stations from which first UE receive signals, said PCI of macro base stations including the PCI of the first macro base station; operating a Spectrum Access System (SAS) to determine from PCI information reported by said first UE, CBSDs in the coverage area of said first macro base station.

Method Embodiment 6

The method of method embodiment 5, further comprising: operating the SAS to instruct CBSDs in the coverage area of the first macro base station to establish X2 connections with the first macro base station.

Method Embodiment 7

The method of method embodiment 1, further comprising: operating CBSDs in the coverage area of said first macro base station to establish X2 connections with said first macro base station, said plurality of different CBSDs being CBSDs with which X2 connections are established with the first macro base station.

Method Embodiment 8

The method of method embodiment 7, further comprising: operating the first macro base station to measure latency of X2 connections to the CBSDs with which X2 connections are established; and wherein communicating to each of a plurality of different CBSDs one or more different ones of said plurality of N data blocks includes communicating blocks to individual CBSDs in said plurality of different CBSDs in an order based on the latency of an individual X2 connection between the first macro base station and the individual CBSD to which the individual X2 communication corresponds.

Method Embodiment 9

The method of method embodiment 8, wherein communicating to each of a plurality of different CBSDs one or more different ones of said plurality of N data blocks includes communicating blocks of data to CBSDs with X2 links having a higher link latency than to CBSDs having X2 links having a lower link latency.

Method Embodiment 10

The method of method embodiment 8, wherein communicating to each of a plurality of different CBSDs one or more different ones of said plurality of N data blocks includes communicating blocks of data to CBSDs in the order of highest X2 connection link latency to lowest X2 connection link latency.

Method Embodiment 11

The method of method embodiment 11, wherein the X2 connection/link latency is the average X2 link latency.

Method Embodiment 12

The method of method embodiment 11 further comprising determining each X2 connections link latency using ping operations.

Method Embodiment 13

The method of method embodiment 13, further comprising: determining a total number of antennas to be used to communicate data to said first UE; and wherein said N number of blocks of data is equal to the number of antennas to be used to communicate to said first UE.

Method Embodiment 14

The method of method embodiment 13, further comprising: receiving (e.g., from the SAS which receives CBSD antenna information from the CBSDs) at the first macro base station information indicating a number of antennas available for use in transmitting to the first UE at each CBSD with which an X2 connection is established.

Method Embodiment 15

The method of method embodiment 13, further comprising: determining a size of a set of data, to be requested from a macro network core, for transmission to the first UE based on the number of antennas available for use in transmitting to the first UE, said number of antennas available for use in transmitting including at least some CBSD antennas at CBSDs having X2 connections with the first macro base station; and requesting the first set of data for transmission to the first UE, said request for the first set of data including information on the determined size of the set of data.

Method Embodiment 16

The method of method embodiment 15, wherein said first set of data is received by the first macro base station in response to said request for the set of data for transmission to the first UE.

LIST OF EXEMPLARY NUMBERED SYSTEM EMBODIMENTS

System Embodiment 1

A communications system, the system comprising: a first macro base station; and a plurality of different Citizens Broadband Radio Service Devices (CBSDs); said first macro base station including one or more processors that control the first macro base station to: receive a first set of data to be transmitted to a first user equipment device (UE), divide said first set of data into a plurality of N data blocks, and communicate to each of a plurality of different Citizens Broadband Radio Service Devices (CBSDs) one or more different ones of said plurality of N data blocks (note the first macro base station can keep and send a block so the number of blocks to CBSDs can be less than N with the first macro base station transmitting at least one block, each CBSD can receive more than one data block with N corresponding to the N number of antennas which will be used to separately transmit data so if a CBSD has two antennas it might receive two blocks for example); and each of said plurality of CBSDs including one or more processors that control the CBSD to transmit the one or more data blocks which the CBSD receives from the first macro base station to the first UE.

System Embodiment 2

The communications system of system embodiment 1, wherein said CBSDs and said first macro base station use the same frequency spectrum, said first macro base station being part of a macro network, e.g., (LTE network) and said CBSDs being part of a Citizens Broadcast Radio Service (CBRS) network.

System Embodiment 3

The communications system of system embodiment 1 wherein said first UE is a dual Subscriber Identity Module (SIM) card UE capable of communicating with the first macro network using a mobile identity corresponding to a first Subscriber Identity Module (SIM) card and communicating with a CBRS network including the CBSD using a mobile identity corresponding to the second Subscriber Identity Module (SIM) card.

System Embodiment 4

The communication system of system embodiment 1, wherein said one or more processor further control the first macro base station to encode each of the N data blocks using an orthogonal code (each block is coded so that it is independent of the other blocks for purposes of transmission from different CBSDs before it is communicated over the X2 connection to the CBSDs) prior to communicating to each of the plurality of different CBSDs one or more different ones of said plurality of N data blocks.

System Embodiment 5

The communications system of system embodiment 1 further comprising: a Spectrum Access System (SAS); and wherein said first UE includes a processor that controls the first UE to report Physical Cell Identities (PCIs) of macro base stations from which the first UE receive signals, said PCI of macro base stations including the PCI of the first macro base station; and wherein said Spectrum Access System (SAS) includes a processor controls the SAS to determine from PCI information reported by said first UE, CBSDs in the coverage area of said first macro base station.

System Embodiment 6

The communications system of system embodiment 5, wherein said SAS processor further controls the SAS to instruct CBSDs in the coverage area of the first macro base station to establish X2 connections with the first macro base station.

System Embodiment 7

The communications system of system embodiment 1, wherein the one or more processors included in each of the CBSDs in the coverage area of said first macro base station control the CBSDs to establish X2 connections with said first macro base station, said plurality of different CBSDs being CBSDs with which X2 connections are established with the first macro base station.

System Embodiment 8

The communications system of system embodiment 7, wherein the first macro base station is further controlled by the one or more processors to measure latency of X2 connections to the CBSDs with which X2 connections are established and wherein the first macro base stations as part of being controlled to communicate to each of a plurality of different CBSDs one or more different ones of said plurality of N data blocks is controlled to communicate blocks to individual CBSDs in said plurality of different CBSDs in an order based on the latency of an individual X2 connection between the first macro base station and the individual CBSD to which the individual X2 communication corresponds.

System Embodiment 9

The communications system of system embodiment 8, wherein to communicate to each of a plurality of different CBSDs one or more different ones of said plurality of N data blocks includes communicating blocks of data to CBSDs with X2 links having a higher link latency than to CBSDs having X2 links having a lower link latency.

System Embodiment 10

The communication system of system embodiment 8, wherein to communicate to each of a plurality of different CBSDs one or more different ones of said plurality of N data blocks includes communicating blocks of data to CBSDs in the order of highest X2 connection link latency to lowest X2 connection link latency.

System Embodiment 11

The communications system of system embodiment 10, wherein the X2 connection/link latency is the average X2 link latency.

System Embodiment 12

The communications system of system embodiment 11 wherein said first macro base station is further controlled by said one or more processors to determine each X2 connections link latency using ping operations.

System Embodiment 13

The communications system of system embodiment 8, wherein said one or more processors included in said first macro base station control the first macro base station to determine a total number of antennas to be used to communicate data to said first UE; and wherein said N number of blocks of data is equal to the number of antennas to be used to communicate to said first UE.

System Embodiment 14

The communications system of system embodiment 13, wherein said first macro base station is controlled by said one or more processors included in said first macro base station to receive (e.g., from the SAS which receives CBSD antenna information from the CBSDs) at the first macro base station information indicating a number of antennas available for use in transmitting to the first UE at each CBSD with which an X2 connection is established.

System Embodiment 15

The communications system of system embodiment 13, wherein said first macro base station is further controlled by said one or more processors included in said first macro base station to: determine a size of a set of data, to be requested from a macro network core, for transmission to the first UE based on the number of antennas available for use in transmitting to the first UE, said number of antennas available for use in transmitting including at least some CBSD antennas at CBSDs having X2 connections with the first macro base station; and request the first set of data for transmission to the first UE, said request for the first set of data including information on the determined size of the set of data.

System Embodiment 16

The communications system of system embodiment 15, wherein said first set of data is received by the first macro base station in response to said request for the set of data for transmission to the first UE.

LIST OF EXEMPLARY NUMBERED COMPUTER READABLE MEDIUM EMBODIMENTS

Computer Readable Medium Embodiment 1

A first non-transitory computer readable medium including a first set of computer executable instructions and a second non-transitory computer readable medium including a second set of computer readable instructions, said first set of computer readable instructions which when executed by a processor of a first macro base station control the first macro base station to: receive a first set of data to be transmitted to a first user equipment device (UE), divide said first set of data into a plurality of N data blocks, and communicate to each of a plurality of different Citizens Broadband Radio Service Devices (CBSDs) one or more different ones of said plurality of N data blocks; and the second set of computer readable instructions which when executed by a processor of a Citizens Broadband Radio Service Device (CBSD) cause the first CBSD to transmit the one or more data blocks which the CBSD receives from the first macro base station to the first UE.

Computer Readable Medium Embodiment 2

The computer readable mediums of computer readable medium embodiment 1 wherein said first set of instructions further includes instructions which when executed by said processor of the first macro base station control the first macro base station to further control the first macro base station to encode each of the N data blocks using an orthogonal code prior to communicating to each of the plurality of different CBSDs one or more different ones of said plurality of N data blocks.

The techniques of various embodiments may be implemented using software, hardware and/or a combination of software and hardware. Various embodiments are directed to apparatus, e.g., macro base station, eNodeB, CBSD, user equipment devices, mobile devices, SAS, Serving, registrars, mobility management entities, network nodes, and/or network equipment devices. Various embodiments are also directed to methods, e.g., method of controlling and/or operating macro base stations, eNodeBs, CBSD devices, network nodes, SAS, nodes, servers, user equipment devices, controllers, mobility management entities or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of the elements or steps are implemented using hardware circuitry.

In various embodiments devices, servers, nodes and/or elements described herein are implemented using one or more components to perform the steps corresponding to one or more methods, for example, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more devices, servers, nodes and/or elements. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., communications nodes such as CBSD, UEs, SAS, macro base stations, eNodeBs, registrars, HSS servers, network service devices, video content servers are configured to perform the steps of the methods described as being performed by the CBSD, UEs, SAS, macro base stations, eNodeBs, registrars, HSS servers, network service devices, video content servers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., CBSD, UE, SAS, macro base station, eNodeB, registrar, HSS server, network service device, video content server, with a processor which includes a component corresponding to each of the steps of the various described methods performed by the device in which the processor is included. In some but not all embodiments a device, e.g., CBSD, UE, SAS, macro base station, eNodeB, registrar, HSS server, network service device, video content server, includes a processor corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a node, CBSD, UE, SAS, macro base station, eNodeB, registrar, HSS server, network service device, video content server. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a CBSD, UE or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method, the method comprising:
establishing by a first macro base station an X2 connection with each of a plurality of wireless base stations operating in a coverage area of the first macro base station;
operating the first macro base station to receive a first set of data to be transmitted to a first user equipment device (UE);
operating the first macro base station to divide said first set of data into a plurality of N data blocks, N being a positive integer number greater than one;
communicating from the first macro base station to one or more of the plurality of wireless base stations one or more different ones of said plurality of N data blocks using said established X2 connections;
operating the first macro base station to encode each of the N data blocks using an orthogonal code prior to performing said step of communicating to one or more of the plurality of wireless base stations one or more different ones of said plurality of N data blocks; and
operating the plurality of wireless base stations to transmit the one or more data blocks, which the wireless base stations receive from the first macro base station to the first UE.

2. The method of claim 1,
wherein said first UE is a dual Subscriber Identity Module (SIM) card UE including a first Subscriber Identity Module (SIM) card and a second Subscriber Identity Module (SIM) card;
wherein said first UE communicates with a first macro network using a mobile identity corresponding to the first Subscriber Identity Module (SIM) card, said first macro network including the first macro base station; and
wherein said first UE communicates with a second network using a mobile identity corresponding to the second Subscriber Identity Module (SIM) card, said second network including the plurality of wireless base stations.

3. The method of claim 1, wherein communicating from the first macro base station to one or more of the plurality of wireless base stations one or more different ones of said plurality of N data blocks includes communicating blocks of data to wireless base stations with X2 links having a higher link latency prior to communicating blocks of data to wireless base stations having X2 links having a lower link latency.

4. The communications method of claim 1,
wherein the first macro base station also communicates one or more of the N data blocks to the first user equipment device, said one or more of the N data blocks communicated by the first macro base station to the first user equipment device being different than the data blocks communicated to the wireless base stations.

5. The communications method of claim 1, further comprising:
determining, by the first macro base station, the plurality of different wireless base stations to which the one or more different ones of said plurality of N data blocks are communicated based at least in part on Physical Cell Identities (PCIs) of wireless base stations reported to the first macro base station by the first user equipment device.

6. A communications method, the method comprising:
establishing by a first macro base station an X2 connection with each of a plurality of wireless base stations operating in a coverage area of the first macro base station:
operating the first macro base station to measure latency of the X2 connections to the wireless base stations with which X2 connections are established;
operating the first macro base station to receive a first set of data to be transmitted to a first user equipment device (UE);
operating the first macro base station to divide said first set of data into a plurality of N data blocks, N being a positive integer number greater than one;
communicating from the first macro base station to one or more of the plurality of wireless base stations one or more different ones of said plurality of N data blocks using said established X2 connections;
operating the plurality of wireless base stations to transmit the one or more data blocks, which the wireless base stations receive from the first macro base station, to the first UE; and
wherein communicating from the first macro base station to one or more of the plurality of wireless base stations one or more different ones of said plurality of N data blocks includes communicating blocks of data to individual wireless base stations in the plurality of wireless base stations in an order based on the latency of an individual X2 connection between the first macro base station and the individual wireless base station to which the individual X2 connection corresponds.

7. The method of claim 6, further comprising:
determining a total number of antennas to be used to communicate data to said first UE; and
wherein said N number of blocks of data is equal to the number of antennas to be used to communicate to said first UE.

8. The method of claim 7, further comprising:
receiving at the first macro base station information indicating a number of antennas available for use in transmitting to the first UE at each wireless base station with which an X2 connection is established.

9. The method of claim 7, further comprising:
determining a size of a set of data, to be requested from a macro network core, for transmission to the first UE based on the number of antennas available for use in transmitting to the first UE, said number of antennas available for use in transmitting including at least some wireless base station antennas at wireless base stations having X2 connections with the first macro base station; and
requesting the first set of data for transmission to the first UE, said request for the first set of data including information on the determined size of the set of data.

10. The method of claim 9, wherein said first set of data is received by the first macro base station in response to said request for the first set of data for transmission to the first UE.

11. The communications method of claim 6, wherein said first UE is a dual Subscriber Identity Module (SIM) card UE which communicates with the first macro base station using a mobile identity corresponding to a first Subscriber Identity Module (SIM) card and communicates with the plurality of different wireless base stations using a mobile identity corresponding to a second Subscriber Identity Module (SIM) card.

12. A communications system, the system comprising:
a first macro base station; and
a plurality of wireless base stations in a coverage area of the first macro base station, each of the plurality of wireless base stations in the coverage area of the first macro base station including one or more processors that control the wireless base station to establish an X2 connection with said first macro base station;
said first macro base station including one or more processors that control the first macro base station to:
receive a first set of data to be transmitted to a first user equipment device (UE),
divide said first set of data into a plurality of N data blocks, N being an integer greater than one, and communicate to one or more of the plurality of wireless base stations one or more different ones of said plurality of N data blocks; and
wherein each of said plurality of wireless base stations which receives from the first macro base station one or more of the plurality of N data blocks is controlled by the one or more processors that control the wireless base station to transmit the received one or more data blocks to the first UE; and
wherein said one or more processors included in the first macro base station further control the first macro base station to encode each of the N data blocks using an orthogonal code prior to communicating to one or more of the plurality of wireless base stations one or more different ones of said plurality of N data blocks.

13. The communications system of claim 12,
wherein said first UE is a dual Subscriber Identity Module (SIM) card UE including a first Subscriber Identity Module (SIM) card and a second Subscriber Identity Module (SIM) card;
wherein said first UE communicates with a first macro network using a mobile identity corresponding to the first Subscriber Identity Module (SIM) card, said first macro network including the first macro base station; and
wherein said first UE communicates with a second network using a mobile identity corresponding to the second Subscriber Identity Module (SIM) card, said second network including the plurality of wireless base stations.

14. The communications system of claim 12, wherein to communicate to one or more of the plurality of wireless base stations one or more different ones of said plurality of N data blocks includes communicating blocks of data to wireless base stations with X2 links having a higher link latency prior to communicating blocks of data to wireless base stations having X2 links having a lower link latency.

15. The communications system of claim 12,
wherein said one or more processors included in said first macro base station control the first macro base station to determine a total number of antennas to be used to communicate data to said first UE; and
wherein said N number of blocks of data is equal to the number of antennas to be used to communicate to said first UE.

16. The communications system of claim 15,
wherein said first macro base station is controlled by said one or more processors included in said first macro base station to receive at the first macro base station information indicating a number of antennas available for use in transmitting to the first UE at each wireless base station with which an X2 connection is established.

17. The communications system of claim 15,
wherein said first macro base station is further controlled by said one or more processors included in said first macro base station to:
determine a size of a set of data, to be requested from a macro network core, for transmission to the first UE based on the number of antennas available for use in transmitting to the first UE, said number of antennas available for use in transmitting including at least some wireless base station antennas at wireless base stations having X2 connections with the first macro base station; and
request the first set of data for transmission to the first UE, said request for the first set of data including information on the determined size of the set of data.

18. The communications system of claim 17, wherein said first set of data is received by the first macro base station in response to said request for the first set of data for transmission to the first UE.

19. A communications system, the system comprising:
a first macro base station; and
a plurality of wireless base stations in a coverage area of the first macro base station, each of the plurality of wireless base stations in the coverage area of the first macro base station including one or more processors that control the wireless base station to establish an X2 connection with said first macro base station,
said first macro base station including one or more processors that control the first macro base station to:
receive a first set of data to be transmitted to a first user equipment device (UE),
divide said first set of data into a plurality of N data blocks, N being an integer greater than one, and communicate to one or more of the plurality of wireless base stations one or more different ones of said plurality of N data blocks; and
wherein each of said plurality of wireless base stations which receives from the first macro base station one or more of the plurality of N data blocks is controlled by the one or more processors that control the wireless base station to transmit the received one or more data blocks to the first UE; and
wherein the first macro base station is further controlled by the one or more processors included in the first macro base station to measure latency of X2 connections to the wireless base stations with which X2 connections have been established; and
wherein the first macro base station as part of being controlled to communicate to one or more of the plurality of wireless base stations one or more different ones of said plurality of N data blocks is controlled to communicate blocks of data to individual wireless base stations in said plurality of wireless base stations in an order based on the latency of an individual X2 connection between the first macro base station and the individual wireless base station to which the individual X2 connection corresponds.

20. A first non-transitory computer readable medium including a first set of computer executable instructions and a second non-transitory computer readable medium including a second set of computer readable instructions,
  said first set of computer readable instructions which when executed by a processor of a first macro base station control the first macro base station to:
    establish X2 connections with a plurality of wireless base stations in a coverage area of the first macro base station;
    receive a first set of data to be transmitted to a first user equipment device (UE);
    divide said first set of data into a plurality of N data blocks; and
    communicate to one or more wireless base stations of the plurality of wireless base stations within the coverage area of the first macro base station one or more different ones of said plurality of N data blocks, N being an integer greater than one; and
  the second set of computer readable instructions which when executed by a processor of a first wireless base station cause the first wireless base station to transmit one or more data blocks which the first wireless base station receives from the first macro base station to the first UE, said first wireless base station being one of the plurality of wireless base stations to which the one or more different ones of said plurality of N data blocks is communicated; and
  wherein said first set of instructions further includes instructions which when executed by said processor of the first macro base station control the first macro base station to encode each of the N data blocks using an orthogonal code prior to communicating to one or more of the plurality of wireless base stations one or more different ones of said plurality of N data blocks.

* * * * *